(12) United States Patent
Basu et al.

(10) Patent No.: US 11,593,321 B2
(45) Date of Patent: Feb. 28, 2023

(54) SYSTEMS AND METHODS OF SELF-ADMINISTERED PROTOCOLS ON A BLOCKCHAIN PLATFORM

(71) Applicant: 0Chain LLC, San Jose, CA (US)

(72) Inventors: Saswata Basu, Cupertino, CA (US); Siva Dirisala, Cupertino, CA (US)

(73) Assignee: 0CHAIN CORP., Cupertino, CA (US)

( * ) Notice: Subject to any disclaimer, the term of this patent is extended or adjusted under 35 U.S.C. 154(b) by 747 days.

(21) Appl. No.: 16/294,814

(22) Filed: Mar. 6, 2019

(65) Prior Publication Data

US 2020/0286049 A1 Sep. 10, 2020

(51) Int. Cl.
| | |
|---|---|
| *G06F 16/21* | (2019.01) |
| *G06Q 20/06* | (2012.01) |
| *G06Q 20/38* | (2012.01) |
| *H04L 9/32* | (2006.01) |
| *H04L 9/06* | (2006.01) |
| *H04L 9/00* | (2022.01) |

(52) U.S. Cl.
CPC ......... *G06F 16/21* (2019.01); *G06Q 20/0655* (2013.01); *G06Q 20/3827* (2013.01); *H04L 9/0637* (2013.01); *H04L 9/3247* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 8,494,992 | B1 * | 7/2013 | Westbrook | G06Q 50/01 |
| | | | | 706/45 |
| 10,747,629 | B2 * | 8/2020 | Abraham | G06F 11/1482 |
| 10,832,337 | B1 * | 11/2020 | Floyd | H04L 9/0637 |

(Continued)

FOREIGN PATENT DOCUMENTS

| | | | | |
|---|---|---|---|---|
| EP | 3793158 A1 * | 3/2021 | | G06Q 20/02 |
| WO | WO-2019226099 A1 * | 11/2019 | | G07C 13/00 |
| WO | WO 2020106845 A1 * | 5/2020 | | |

OTHER PUBLICATIONS

Zhu et al, "Controllable and thustworthy blockchain-based cloud data management", Future Generation Computer Systems 91 (2019) pp. 527-535.*

(Continued)

*Primary Examiner* — Uyen T Le
(74) *Attorney, Agent, or Firm* — Levine's Tech Consulting LLC; Frank E. Levine

(57) ABSTRACT

The present invention is systems and methods of self-administering protocols on a blockchain platform. A system and method of self-administered protocols on a blockchain platform, comprising: self-administering one or more of the following actions: consensus, governance, self-forking, view change or finality of transactions on the blockchain platform; operating without a hierarchical structure to make decisions; validating the decision to avoid rogue decisions or attacks; setting of a time period to lapse to finalize the decision; allowing the set time period to lapse; finalizing the decision by saving the state on the blockchain platform. Self-administering also includes the capability of the blockchain platform to prune the state of the smart contracts and the global state of the blockchain platform.

24 Claims, 12 Drawing Sheets

(56) References Cited

U.S. PATENT DOCUMENTS

| | | | |
|---|---|---|---|
| 2016/0140789 A1* | 5/2016 | Wickersham, III | H04W 4/021 705/12 |
| 2018/0123882 A1* | 5/2018 | Anderson | H04L 43/16 |
| 2018/0130050 A1* | 5/2018 | Taylor | H04L 9/3247 |
| 2018/0349621 A1* | 12/2018 | Schvey | G06Q 20/223 |
| 2019/0179672 A1* | 6/2019 | Christidis | G06F 9/5038 |
| 2019/0258610 A1* | 8/2019 | Dang | H04L 9/3247 |
| 2020/0092085 A1* | 3/2020 | Baek | H04L 9/3265 |
| 2020/0134578 A1* | 4/2020 | Shi | G06Q 20/065 |
| 2020/0192770 A1* | 6/2020 | Walid | H04L 9/3247 |
| 2020/0272619 A1* | 8/2020 | Alferov | H04L 9/0643 |

OTHER PUBLICATIONS

Arruñada, Benito, and Luis Garicano. "Blockchain: The birth of decentralized governance." Pompeu Fabra University, Economics and Business Working Paper Series 1608 (2018).39 pages. (Year: 2018).*

Paul Merrill and Thomas H. Austin. Storage on the 0Chain Network: the Blockchain Observable Storage System. Dec. 6, 2018.

Paul Merrill and Thomas H. Austin. 0chain token reward protocol. Dec. 6, 2018.

Ittay Eyal and Emin Gun Sirer. Majority is not enough: bitcoin mining is vulnerable. Communications of the ACM, 61 (7):95-102, 2018.

Timo Hanke, Mahnush Movahedi, and Dominic Williams. DFINITY technology overview series, consensus system. CoRR, abs/1805.04548, 2018.

David Karger, Eric Lehman, Tom Leighton, Rina Panigrahy, Matthew Levine, and Daniel Lewin. Consistent hashing and random trees: Distributed caching protocols for relieving hot spots on the world wide web. In Proceedings of the Twenty ninth Annual ACM Symposium on Theory of Computing, STOC '97, pp. 654-663, New York, NY, USA, 1997. ACM.

Satoshi Nakamoto. Bitcoin: A peer-to-peer electronic cash system, 2009.

Andrew Poelstra. On stake and consensus, https://download.wpsoftware.net/bitcoin/pos.pdf, 2015.

Gavin Wood. Ethereum: a secure decentralised generalised transaction ledger. https://gavwood.com/paper.pdf, 2014.

L.M Goodman. Tezos | a self-amending crypto-ledger. Technical report, Tezos Foundation, 2014.

Adam Back, Matt Corallo, Luke Dashjr, Mark Friedenbach, Gregory Maxwell, Andrew Miller, Andrew Poelstra, Jorge Timon, and Pieter Wuille. Enabling blockchain innovations with pegged sidechains, https://blockstream.com/sidechains.pdf, 2014.

Saswata Basu and Thomas Austin. A self-forking, zero-cost, subsecond blockchain protocol, Jan. 22, 2018.

Mesosphere. The definitive platform for modern apps: Dc/os. https://dcos.io.

Merrill, Austin, Thakker, Park and Rietz, Lock and Load: A Model for Free Blockchain Transactions through Token Locking. IEEE DappConn, 2019.

* cited by examiner

| Network Relay time | BlockTime | Wait mode | Steady-state finality | Start-to-finish finality | % rounds, 1 notarization |
|---|---|---|---|---|---|
| 200 | 200 | static | 1200 ± 140 | 4300 ± 300 | 95.1% |
| 600 | 200 | static | 1300 ± 160 | 5300 ± 400 | 95.1% |
| 400 | 400 | static | 1300 ± 140 | 5000 ± 400 | 95.3% |
| 200 | 800 | static | 1400 ± 120 | 5000 ± 300 | 99.4% |
| 200 | 200 | dynamic | 1300 ± 150 | 4000 ± 400 | 95.4% |
| 400 | 400 | dynamic | 1300 ± 150 | 5000 ± 400 | 95.3% |
| 200 | 800 | dynamic | 1300 ± 140 | 4600 ± 400 | 95.9% |
| 200 | 1600 | dynamic | 1300 ± 200 | 4700 ± 400 | 97.0% |

Table 1: Finality times as a function of the network and protocol parameters. All reported times are in milliseconds.

FIG.8

(a) New proposal created (b) Proposal passes, opponents begin to vote (c) Opponents veto proposal (d) Supporters override the opponents (e) Opponents of the proposal rally (f) Supporters add votes, veto threshold changes ics of distributed governance were applied to digital
SYSTEMS AND METHODS OF SELF-ADMINISTERED PROTOCOLS ON A BLOCKCHAIN PLATFORM If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

FIELD OF THE INVENTION

The present invention is in the technical field of cloud computing. More particularly, the present invention is in the technical field of blockchain platform. More particularly, the present invention is in the technical field of establishing self-administering protocols on a blockchain platform. The present invention is in the technical field of an automated and distributed consensus protocol, a governance protocol, a self-forking protocol, a view change protocol or determining finality of transactions protocol on a blockchain platform.

BACKGROUND

Internet is a global computer network providing a variety of information and communication facilities, consisting of interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. The blockchain platform operates with no established hierarchy. There is no single authority to validate or authenticate the events occurring on the blockchain platform. Everything is supposedly open, transparent and everyone who is interested can monitor the blockchain platform. In such situations, there is no established mechanisms to resolve inconsistencies or network outages. Without an established set of rules or hierarchy, a distributed and de-centralized platform is vulnerable to chaos and cannot grow efficiently.

Industry implementations show consensus on blockchains is extremely slow. For example, in Bitcoin a transaction is not considered finalized until six subsequent blocks have been accepted, a process which takes roughly one hour. Newer protocols have attempted to address this limitation by introducing consensus algorithms with faster finalization of blocks. One such protocol, Dfinity uses a randomness beacon (implemented via a verifiable random function, or VRF) for ranking different proposed blocks. The designers also introduce the concept of notaries who sign the highest-ranked block in each round. The authors describe notarization as "optimistic consensus"; in most rounds, only one block will be notarized, and in that case the unique notarized block will be finalized soon thereafter. Critically, only notarized blocks will be accepted as part of a chain by miners; this design prevents both selfish mining and the "nothing-at-stake" problem.

Another challenge with blockchain based protocols is that they are difficult to update once launched. Upgrading requires participants to explicitly opt-in to the new version by installing new versions of the protocol. While some systems, for example Tezos, allow a system for upgrading the blockchain client through a community consensus, changes happen automatically and smoothly, however, only one change may be implemented per voting period, and changes must have substantial buy-in from the community.

Typically, a blockchain's consensus algorithm is a variation of dFinity consensus protocol. dFinity assumes all critical messages are received by every miner no later a certain amount of time (upper bound for network relay). By making this assumption, they are able to prove their consensus to be deterministic. However, this may not be practical in an openly deployed blockchain where it is not possible to assume such optimistic conditions on the network and infrastructure of the miners. As a result, the consensus algorithm of blockchain is assumed to have probabilistic finality although the probability increases exponentially as the chain gets extended. While the probabilistic finality is reasonable from a practical standpoint due to its exponential nature, the question is whether we can theoretically make the blockchain's consensus to have deterministic finality.

SUMMARY OF THE INVENTION

The present invention is systems and methods of self-administering protocols on a blockchain platform. A system and method of self-administered protocols on a blockchain platform, comprising: self-administering one or more of the following actions: consensus, governance, self-forking, view change or finality of transactions on the blockchain platform; operating without a hierarchical structure to make decisions; validating the decision to avoid rogue decisions or attacks; setting of a time period to lapse to finalize the decision; allowing the set time period to lapse;
finalizing the decision by saving the state on the blockchain platform.

The systems and methods, wherein self-administering the action of consensus is further comprising of: receiving a selection to be part of an active set based on activities on the blockchain platform from a set of active providers; sending affirmative or negative response when not part of the active set of providers to indicate interest to participate in the blockchain platform; receiving notification of selection in a designated pool set that includes the active set and providers with affirmative response for indication of interest to participate in the blockchain platform; receiving a random notification of selection to be a generator to generate a block to finalize a round; generating a signature for the block; sending verification for the block to one or more providers;

tallying ticket based on verification responses; setting the time period to be a period longer than a median network latency; automatically finalizing the round after the set time period is lapsed.

The systems and methods, further comprising: submitting stake transactions for the affirmative response, receiving the notification of selection on the designated pool set based on an assigned manual weight, count weight, stake weight or reputation weight on the blockchain platform, receiving notification of deselection from the active set or the pool set.

The systems and methods, wherein self-administering the action of governance is further comprising of: receiving a desired change that is configuration, moderation or feature change request; validating the change request; tallying votes for the change request; entering a review period when affirmative votes exceed negative votes; setting the time period to be a set of time cycles for the review period that allows restarting the time period after a vote is received; confirming the configuration or moderation change or approving implementation of feature change on the blockchain.

The systems and methods, wherein self-administering the action of self-forking is further comprising of: locking tokens on a main chain of the blockchain platform; allocating shadow tokens on a side chain created; allowing bonding, minting, burn or unbonding transactions.

The systems and methods, further comprising: using native tokens on the side chain; using smart contracts to translate native tokens to shadow tokens on the main chain.

The systems and methods, wherein self-administering the action of view-change is further comprising of: allowing a miner to join or drop-off using partial state synchronization; setting the time period for the miner to synchronize to the global state of the blockchain platform.

The systems and methods, further comprising: maintaining consistent state with ongoing network partition of the blockchain platform by delaying the join or drop-off to occur only after completion of the network partition.

The systems and methods, wherein self-administering the action of finality is further comprising of: setting the time period for finality to be the same as notarization of a block; moving a block from local cache to probabilistic finalized after establishing it as the sole common prefix to all subsequent block extensions across multiple extensions; moving the block from probabilistic finalized to deterministic finalized after receiving the same number of subsequent block extensions.

The systems and methods, wherein self-administering the action of finality is further comprising of: setting the time period for finality based on receipt of intent tickets for a generating block; moving a previous block associated with the generating block from local cache to deterministic finalized based on tally of intent tickets.

The systems and methods of self-administering, further comprising of: periodically storing the state as secure key value storage and discovering missing keys; recovering a state based on lack of usage for a period of time; fetching missing data in batches.

The systems and methods of self-administering, further comprising of: pruning the state of the smart contracts and the global state of the blockchain platform.

A method of self-administered protocols on a blockchain platform, comprising: joining the blockchain platform network without first syncing an entire state based on a full list of transactions; waiting for a notarized block; syncing the partial state changes that would result if the notarized block was processed under normal operations; incrementally syncing to the entire state.

The method, further comprising: failing verification only if the partial state is insufficient to validate the transaction.

The method, further comprising: generating a block using the partial state; and skipping any transactions that cannot be processed with the partial state.

BRIEF DESCRIPTION OF THE DRAWINGS

The embodiments of this invention are illustrated by way of example and not limitation in the figures of the accompanying drawings, in which like references indicate similar elements and in which:

FIG. 8 is Table 1 showing simulation results of finality times as a function of the network and protocol parameters.

DETAILED DESCRIPTION OF THE INVENTION

Figure 1:
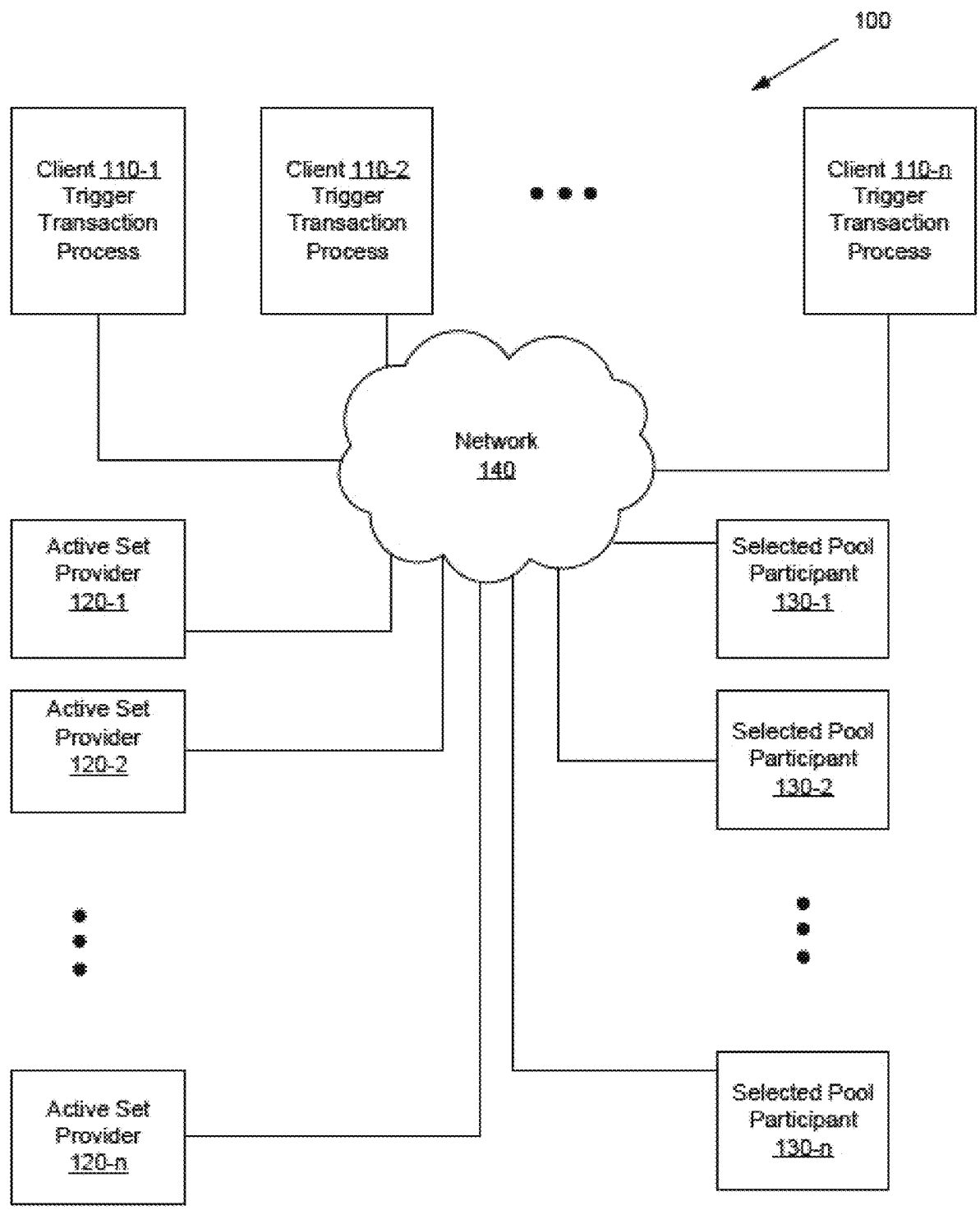
FIG. 1 shows a diagram illustrating an example of a system and method of consensus protocol on a blockchain platform for rule-based de-centralized roles and control.

The systems and methods of different self-administering protocols on the blockchain platform include (i) an automated and distributed consensus protocol, (ii) a governance protocol, (iii) a self-forking protocol, (iv) a view change protocol or (v) determining finality of transactions protocol on a blockchain platform.

I. An Automated and Distributed Consensus Protocol.

The systems and methods of a consensus protocol on a blockchain platform offers a fast, flexible and free platform for dynamic application ("dApp") development through a proof-of-stake consensus protocol and a governance protocol that supports both lightweight, non-controversial changes to be implemented as well as supporting more extensive and potentially controversial changes. First, the consensus protocol assigns various parties in the system specialized roles: at any given time, a subset of clients (referred to as the "active set") serve as miners running the consensus protocol; in turn, a subset of the miners act as generators proposing new transactions. Sharders store the blockchain history and respond to queries about the history; and blobbers store data needed for dApps. This design allows for more specialized machines to be used for each of these roles; by reducing the number of parties running the consensus protocol at any point in time, it also reduces network latency thus improving finalization time. The consensus protocol also introduces a squared staking approach for Sybil resistance, by which miners and sharders are probabilistically chosen (and then subsequently rewarded) based on the square of the number of tokens they have staked; this design incentivizes miners and sharders to stake their coins in a single account, and thus risk greater penalties should they fail to perform their duty. Finally, the consensus protocol makes very mild assumptions about the network latency, in contrast to Dfinity's requirement that the maximum transmission time between any two nodes is bounded by a known constant $\Delta$. This allows for faster confirmation time because nodes do not need to wait $O(\Delta)$ time in order to progress, but can instead progress shortly after they receive their expected messages.

The governance protocol provides this flexibility of supporting both lightweight and extensive changes by supporting different thresholds for different types of changes, which we divide into configuration changes, moderation, and feature requests. We expect that moderation will be relatively non-controversial, that feature requests are likely to be highly controversial, and that configuration changes might be either.

Entities. There are several roles within the blockchain ecosystem. A client is anyone who possesses blockchain tokens. At any point in time, some subset of the clients constitute the active set and we refer to those clients as miners. (The active set is updated on a regular basis, and the mechanism for doing so is detailed in Section 4.) All miners serve as notaries and also implement the randomness beacon. At any given point in time, some subset of the miners also serve as generators that are responsible for extending the blockchain with new transactions. By only having a subset of the clients acting as miners, and a subset of miners act as generators, we reduce network traffic and decrease the time for messages to flood the network. The blockchain ecosystem also includes sharders who are responsible for storing older blocks in the blockchain, and blobbers who store arbitrary data committed to the blockchain; the set of active sharders is also updated regularly. This division of responsibilities is one of the cornerstones of the blockchain architecture. Assigning specific tasks to specific entities, allows for greater specialization of machines and load-balancing of different tasks. For example, blobbers must be good at storing large amounts of data, but do not need the same degree of computational power that a sharder needs. We discuss sharders and blobbers below; note, however, that they are not directly relevant to the analysis of the consensus protocol itself.

Mining Algorithms. The blockchain's mining process follows in the footsteps of Dfinity to rapidly produce and finalize blocks. Within a given epoch (namely, a period of time during which the active set does not change), the blockchain is extended in a sequence of rounds where in each round r the mining process works as follows: (1) The (decentralized) randomness beacon produces a random value $\xi r$. For example, several techniques known by a person of ordinary skill in the art allow generation of random value, including as given in DFINITY. (2) The value r is used to determine which miners will be generators in the current round. Each miner is chosen to be a generator with the same probability (i.e., independent of their stake). The random value is also used to determine a ranking among the generators (as known in the industry, including for example, in DFINITY). (3) Each generator extends its current chain of length r−1 by adding a new signed block containing all pending transactions of which it is aware. Each generator sends the updated chain (which includes its new block) to all other miners.

Continuing (4) After waiting a fixed amount of time (denoted BlockTime), each miner—acting as a notary—considers all the valid, length-r chains it has received. (A chain is valid if it consists of blocks chained back to the genesis block in the usual way, where for i<r the ith block is notarized for round i.) It then ranks these chains by the generator of the rth block. For all highest-ranked chains with rth block Br, it sends a signed verification ticket for Br (and the corresponding chain) to all miners. Miners continue doing this until a block has been notarized for the current round. (A miner continues issuing verification tickets if new blocks with the same or higher priority arrive after it has already issued a verification ticket for another block, but before the next round has begun.)

(5) As in DFINITY, when there are sufficiently many verification tickets for a block, that block is considered notarized. We currently consider a block to be notarized only if it has been verified by a strict majority of miners, but it is also possible to require a strict majority of the total stake of the active set. Once a miner sees the first notarized block for the current round, it sends the notarization (i.e., the collection of verification tickets 1 for that block) to all miners; sends the notarized block to the sharders; and proceeds to the next round.

(6) Our notion of consensus is similar to the one used in Bitcoin. Specifically, in round r each miner and sharder takes their current chain to be any valid, notarized chain of length r−1 (ties can be broken arbitrarily). This means there may be temporary disagreement, however we show that miners/sharders disagree on blocks at depth r−k with probability exponentially decreasing in k.

We now prove that the modified protocol above satisfies safety as long as the honest miners are a strict majority of the active set, and liveness as long as there is at least one honest generator. We assume that all messages are eventually delivered, but make no assumptions about how long such delivery takes. For the purposes of analyzing the protocol we assume at least one honest generator. In our full protocol, however, we include a mechanism to update the set of generators if no new blocks are added after some specified time.

Theorem 1. For any r, every honest miner eventually enters round r. Proof. An honest miner enters round r only once it has received a notarized block for round r−1, which it then forwards to all other miners. So once one honest miner enters round r, all other honest miners will eventually enter round r.

Consider now some honest miner in round r−1. As just argued, all honest miners eventually enter round r−1, and so the value $\xi r$ from the randomness beacon is eventually generated and received by all honest miners. Since there is at least one honest generator, there will be at least one block proposed for round r−1; moreover, that block will eventually reach all notaries and so at least one round-(r−1) block will be notarized. The notarization is eventually received by the honest miner, who then enters round r.

We say that a round r is normal, denoted $Normal_r$, if only one block is ever notarized for round r. Note that under our stated assumptions (when the adversary can act arbitrarily)

this means there is a round-r block Br such that each honest notary has only issued a verification ticket for Br in round r by the time they enter round r+1. (This suffices since honest notaries only issue verification tickets for blocks belonging to the current round.)

We say round r is finalized if there is a round-r block Br such that the chain of any honest miner in any round rl, r includes Br. In other words, there is permanent agreement among all honest miners on the block at position r (though the honest miners may not be aware of the fact).

Lemma 1. If $Normal_r$ occurs then each of rounds 1, . . . , r is finalized.

Proof. Let Br be the unique block notarized in round r. The theorem follows from the fact that the chains held by any honest miners at any round rl≥r must include Br.

Consider the time when the first honest miner begins some round, and let $p_{normal}$ denote the minimum probability, taken over the random value ξ produced by the randomness beacon and the random latencies 3 of the various links in the network, that the given round is normal (where the minimum is taken over all possible configurations of the honest miners and all possible actions of the attacker).

We have Theorem 2. Assume an honest miner is in round r. Then the probability that round r-k is not finalized is at most $(1-p_{normal})^k$.

Proof. Consider the honest miner at the beginning of round r who holds a chain of length r-1. Round r-k is finalized if any of the k rounds r-k, . . . , r1 is normal. This implies the theorem.

Of course, the theorem is only interesting if $p_{normal}>0$. But note that $Normal_r$ occurs, at least, when (1) the generator with highest priority is honest and (2) the message from that generator reaches each honest notary before that notary sends out a verification ticket for round r. In general, $p_{normal}$ depends on the distributions over the latencies of the various links in the network, as well as on the value of BlockTime. Under certain conditioned, it may be possible to rigorously bound $p_{normal}$; for example, this is possible if one is willing to assume an absolute upper bound Δ on the transmission times between all pairs of miners, as long as BlockTime large enough relative to Δ. In other cases, bounds on $p_{normal}$ may be obtained via simulation. We include in Table 1 (FIG. 8) some preliminary experimental results that can be used to bound $p_{normal}$.

Choosing the Active Set. The active set is updated in a series of epochs. A new epoch is begun every predetermined number of rounds, but initiation of a new epoch can also be triggered earlier by the current active set if some miners fall below an expected level of service.

In order to be considered for membership in the next active set, a client must write a transaction to the blockchain staking some number of tokens that they hold. (Staking a token means locking it so it cannot be spent; staking also allows punishment if the client staking a token later misbehaves.) The staked tokens of any clients who are not selected are immediately unstaked (i.e., become available for that client to spend again). If a client is selected for the active set, its staked tokens remain staked until it leaves the active set in some future epoch.

We wish to incentivize clients to stake tokens under one identity rather than under many separate identities. Therefore, we set the probability of being selected for the active set to be proportional to the square of a client's staked tokens. 4 So, for example, if Alice stakes 2 tokens and Bob stakes 1 token, and if only one client is chosen, then the probability for Alice to be chosen is $2^2/(2^2+1^2)=4/5$ and the probability for Bob to be chosen is 1/5. (In contrast, if probabilities were directly proportional to stake then the probability of Alice being chosen would be 2/3 and the probability of Bob being chosen is 1/3.) Note that this encourages Alice to stake her tokens under one name; if she staked 1 token as Alice and another as Ann then the probability of either Alice or Ann being chosen would be $2*1^2/(1^2+1^2+1^2)=2/3<4/5$.

The process for choosing a new active set for the next epoch in some round r is as follows: (1) The value r from the randomness beacon is used to select 10% of the current miners to be removed from the active set. It is also possible to instead remove the 10% worst performers in the epoch. We remark that this latter approach potentially allows an attacker to attempt to increase its representation in the active set by always trying to ensure that it is not in the bottom 10% of performers. Another way of looking at this, however, is that the attacker is thereby incentivized to perform well (at least part of the time). (2) Replacements for the clients who have been removed are selected from among clients who have staked tokens to be selected for the next epoch. As discussed above, each client's chance of being selected is proportional to the square of their total staked tokens. (3) The miners in the new active set have some number of rounds to sync up with the blockchain before they begin mining. The mechanism for doing so will be described in a subsequent document.

Sharders and Blobbers. Sharders. Due to the rapid rate at which blocks are produced, it quickly becomes infeasible for miners to store the entire blockchain. Instead, that role is offloaded to another group of entities, called sharders. A given sharder does not store all blocks, either; instead, each sharder stores only a subset of the blocks. The blocks that any given sharder is responsible for is determined by the sharder's ID, using an approach similar to consistent hashing. Specifically, in order to determine which sharders are responsible for storing a given block, a function of each sharder's ID and the block hash is used to generate a value; those values are used to rank all the active sharders, and the top n sharders store that block. In the case of ties, additional sharders may store the block.

Sharders are chosen to be active the same way miners are chosen to be part of the active set, and on the same schedule. However, in each epoch a smaller percentage of sharders is replaced. Note that when a sharder becomes inactive, the only blocks that needs to be reallocated are those that were stored by the sharder who is leaving. When a sharder joins, they must determine which blocks in the entire blockchain, starting at the genesis block, they are responsible for holding. Sharders begin storing new blocks immediately, and have some number of rounds to try to obtain older blocks for which they are responsible.

Clients who need to access an old block in the blockchain can request the block from one of the sharders responsible for holding it. A client might ask a sharder for a given block before the sharder has stored it (e.g., in case that sharder has only recently become active). In this case, the sharder can simply request the block from another sharder responsible for that block.

Blobbers. Blobbers provide storage for the blockchain network. While they are primarily focused on facilitating decentralized applications (dApps), they are not limited to that role; if clients wish to use blobbers simply for distributed storage, they may do so.

Unlike miners and sharders, blobbers are not selected as part of the rotating active set. Instead, blobbers are assigned to handle a specific client's storage at the time that client first locks up tokens to acquire the right to storage resources. At that time, blobbers are selected by the mining network from the blobbing pool based on the needs of blockchain clients. For instance, a blockchain client might have business in London and San Jose, and hence blobbers located in those geographic regions would be preferable.

Advantages of Consensus Protocol. Our protocol and its implementation incorporate several features that result in fast time to finality. Faster network-traversal time. The time required for transaction propagation, block generation, verification, notarization, and finalization all scale linearly in BlockTime, which in turn is related to the network latency. Thus, decreasing the network latency directly impacts the time to finalization.

We keep the active set small, which lowers the network-traversal time required for messages to be propagated to all members of the active set. Note also that we do not require clients who are not currently part of the active set to receive messages sent as part of the consensus protocol during a given epoch; instead, clients will obtain a copy of the current head of the chain upon joining the active set.

Although we have a small active set, attacking the consensus protocol would require an adversary to control both a majority of the current active set as well as a majority of the stake that was staked by the members of the active set. By setting the mining reward sufficiently high, we can ensure that miners need to stake a large number of tokens in order to have a reasonable chance of controlling half the stake in the active set—something that would impose an unreasonably high cost on an attacker. Our squared staking approach also helps deter an attacker from being able to control more than half the stake in the active set.

We apply additional optimizations to reduce the network traffic, since this will also result in lower latency. For example, miners do not send full notarized blocks to the sharders; instead, they only send hashes of notarized blocks to the sharders, and the sharders then request any blocks they do not already have from a single miner.

Faster finalization. In executing the protocol we can dynamically adjust BlockTime based on the observed network latency in order to minimize the time to finalize blocks. In particular, we suggest to set BlockTime equal to the median (observed) network latency. In Table 1 (FIG. 8) we report some experiments that illustrate the effect of setting BlockTime in this way.

We simulated the blockchain protocol with 100 miners, 4 generators and 30 sharders (with each block being replicated 6 times). The miners are spread across 14 different data centers around the world (California, Canada, Frankfurt, Ireland, London, Mumbai, Ohio, Oregon, Paris, Seoul, Singapore, Sydney, Tokyo and Virginia). Although our simulations do not incorporate adversarial behavior, they do give a sense of how the protocol behaves under realistic network conditions. Our experiments provide empirical evidence regarding how finality time is related to the underlying parameters.

In our experiments, we found that the block-generation time and verification times are significant and comparable to message-delivery times; we also found that message-delivery times are noticeably different for short messages (e.g., VRF shares and verification tickets) and large messages (e.g., blocks), with the latter taking up to 3 longer to arrive than the former.

In our experiments, we vary the block-proposal wait time, wait mode (static vs. dynamic), and the finality wait time. The table below shows the time for block finality in steady-state, the start-to finish time for block finality, and the percentage of rounds in which only one block was notarized. (In our experiments we never observed 4 blocks being notarized in a round, and the percentage of rounds in which 3 blocks were notarized never exceeded 0.03%.) In our experiments we set the finalization wait time to twice the network relay time, and set the finality lag to 3 blocks. Hence, the start-to-finish finality time is 3 times the steady-state block finality time plus the finalization wait time.

Because we have a small active set, under honest operation the probability of having multiple finalized blocks in a given round is low.

II. Governance Protocol.

Essentially, clients who own blockchain tokens may temporarily lock tokens to produce token rewards for service providers. Clients are not limited to locking tokens. They may instead spend their tokens, which produces greater rewards for fewer tokens. However, clients who choose this option lose the ability to re-use their tokens, giving up the "free" aspect of blockchain's design.

In our voting protocol, these token rewards are treated as votes; by locking more tokens, clients may dedicate more votes to a proposal that they favor. Similarly, they may allocate token rewards against any proposals that they oppose. A critical aspect of our design is that our voting mechanism can measure both whether a proposal has broad community support and the degree of support or opposition from different parties for a specific proposal.

One concern in voting protocols is that a wealthy supporter of a proposal could sweep in during the last moment of voting to pass or defeat a measure before other members of the community could react. This is a particular concern for our protocol, since clients have an economic cost associated with voting for a proposal. Our design addresses this issue by having multiple rounds of voting. If a proposal passes, it is followed by a review period where the community may veto the proposal. If a proposal if vetoed, the community may vote to override the veto. The override itself may be vetoed, which may also be overridden, and so on. Eventually, one side or the other will exceed a threshold that the other side cannot match and the issue will be settled. To minimize the back and forth votes, the vetoing/overriding faction must exceed the threshold by a fixed buffer amount.

Our protocol can be used to govern three broad areas: configuration, adjusting the settings of the chain; moderation, to punish bad service providers or to delete objectionable data; and feature proposal, to gauge community interest in deeper revisions to the blockchain protocol.

Governing Configuration Changes. The community can vote to adjust a number of parameters of the blockchain, including: (i) The interest rate multiplier for generating new tokens. (ii) The locking period used when generating new tokens. (iii) The percentage of mining transaction rewards reserved for the sharder's pool. (iv) The percentage of rewards from the sharder's pool reserved for the validators. (v) The maximum number of miners at any given time, referred to as the active set. (vi) The voting thresholds. (vii) The multiplier for "nay" votes.

Moderation. Moderation allows the blockchain community to police itself. The community can vote to seize stake of a poorly performing service provider, de-register a service provider, or boot a service provider from the active set. In the context of storage, this could also be used to delete illegal content from a blobber.

We expect that these changes are less likely to be controversial and will require a lower threshold level. A party being punished will have a very strong interest in defeating the proposal. However, to defeat the proposal, the service provider would need to dedicate additional coins to veto the vote, "throwing good money after bad" so to speak. Note that the staked tokens cannot be used for voting, since they are already locked.

Feature Requests. Beyond configuration changes or moderation, the community may wish to make more sweeping changes to the blockchain protocol. Our voting mechanism can also be used for these changes, though it is advisory only.

Following Tezos's approach, each proposal contains a hash of the modified code base, eliminating any ambiguity about what changes are proposed. If the proposal is accepted by the community, it will be deployed to testnet to run for 30 days. During that time, clients may vote to veto the change. Since these changes are more extensive, we set the threshold for the proposal to a high level, favoring broad community support over flexibility.

Decentralized Application Changes. Individual decentralized applications (DApps) will require the same types of changes (configuration, moderation, feature requests) as the blockchain protocol itself. However, since there may be substantially fewer interested parties, each DApp may specify its own threshold settings. The design and challenges are otherwise identical.

Proposing Changes. Now that we have reviewed the types of changes we wish to support, we review the mechanism for proposing these changes. Any client with blockchain tokens may make a proposal by writing a transaction to the blockchain. We refer to this client as the champion. The process works as follows: (1) A champion writes a transaction to the blockchain, specifying: (i) changes desired; (ii) Amount of token rewards to dedicate to this proposal. This step creates two new pools: an accept pool that tallies tokens voting in favor, and a reject pool that tallies tokens voting to oppose the proposal. We refer to the tokens in the accept pool as yay votes and the tokens in the reject pool as nay votes. (2) Other clients may add tokens to either pool at any time. (3) Once the yay votes exceed the nay votes by the specified threshold, the proposal tentatively passes. The protocol enters a review period, where clients may continue to vote for either side. (4) If the opponents of the review period are unable to veto it, then the proposal is accepted and voting is ended. Any configuration changes or moderation actions take effect after 100 rounds. This delay allows the miners to come to consensus on the allowed mining settings, and avoids having to accept multiple valid configurations for the chain. (Feature requests are advisory only, and so no action is taken whether they pass or not)>

All tokens transferred to the accept and reject pools are unspendable, and can be considered burned. We expect that most clients will vote by locking tokens, following our token-locking reward model. However, clients who feel particularly passionate about a change might elect to spend their tokens instead. This design favors the major stake holders (who hold the most tokens), but gives some recourse to the minor stake holders.

Vetoing Proposals, and Overriding Vetoes. One concern with our design is that a last-minute voter might dump a significant number of votes without giving the opposing side a chance to rally. To avoid this issue, a tentatively accepted proposal enters a review period.

During the review period, opponents of the proposal may add nay votes to the reject pool. If the nay votes exceed the yay votes by 10% before the end of the review period, the proposal is immediately vetoed.

At this point, a new review period begins. The yay votes may override the nay votes. This time, the yay votes must exceed the nay votes by 10% before the end of the review period; if the supporters of the proposal successfully gather enough votes, the veto is overridden, and yet another review period begins immediately.

This process may continue indefinitely. Whenever one side is able to exceed the other by the specified threshold, a new review period begins to either veto the proposal or override the veto.

Once a review period has ended without one pool exceeding the threshold of the previously winning pool, the voting is closed; the proposal is either accepted or defeated. Either way, both the proposal pool and the veto pool may be garbage collected after the review period has finished, and any tokens in these pools are effectively burned.

Figure 9:
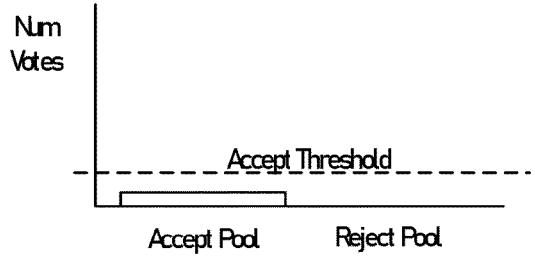
FIG. 9 shows Governance protocol time periods with different scenarios.
Figure 9:
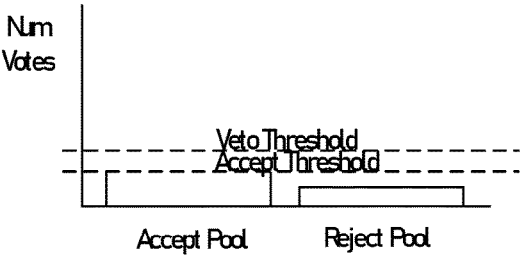
Figure 9:
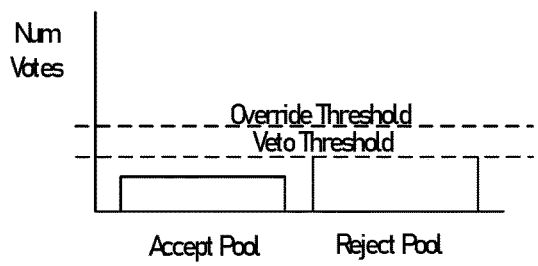
Figure 9:
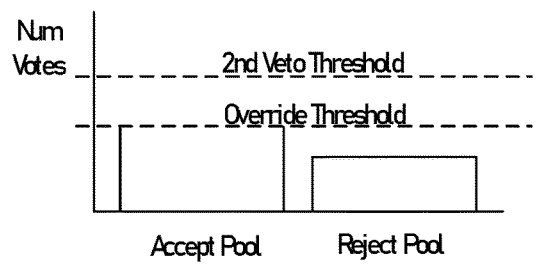
Figure 9:
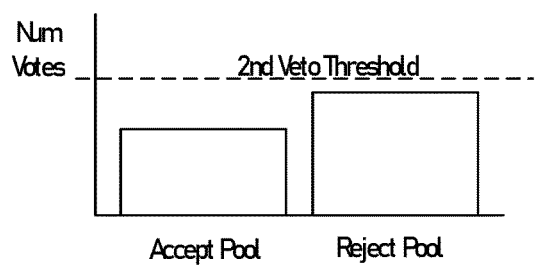
Figure 9:
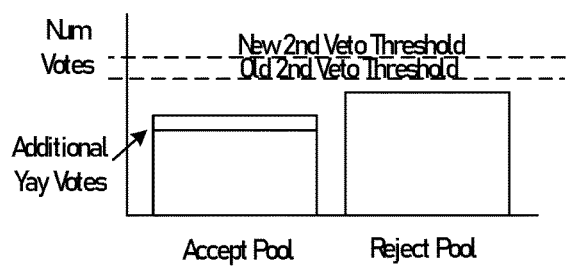

Illustrated Example show in FIG. 9. To better illustrate the concepts of our protocol, FIG. 9 shows a proposal in action. FIG. 9a demonstrates the creation of the new proposal. An accept pool and a reject pool are created, with votes allocated to the accept pool by the champion. In FIG. 9b, enough supporters have committed tokens to the proposal for it to pass, and the changes will be automatically accepted by the blockchain protocol if the proposal is not vetoed within the review period. In FIG. 9c, enough members find the change to be controversial to collect more 10% more nay votes than yay votes. The proposal is vetoed, and a new review period begins.

Enough members of the community support the proposal to override the nay votes, shown in FIG. 9d. Another review period begins.

The opponents of the proposal rally and commit additional tokens to the reject pool, as shown in FIG. 9e. However, before the opponents of the proposal can gather enough votes, supporters of the proposal allocate additional yay votes to push the veto threshold out of reach of the proposal's opponents, shown in FIG. 9f. Even if the opponents manage to gather enough votes to pass the second veto threshold, the proposal will be accepted at the end of the review period unless the third threshold is reached. Once a review period completes without being defeated by the opposition, both the proposal pool and veto pool may be garbage collected. The tokens in these pools are burned.

Weighting of Votes. In our discussion so far, we have treated yay votes and nay votes as having equal weight. However, it may be desirable to weight nay votes more heavily in order to avoid overly controversial changes. To allow this flexibility, the blockchain has a parameter for a nay vote multiplier. For instance, if the nay vote multiplier is set to 4, then while each token added to the accept pool counts as 1 vote, each token added to the reject pool counts as 4 votes.

III. Self-Forking Protocol

The goal of the self-forking protocol described herein is to allow clients to automatically create new blockchains with their own desired parameters. Service providers on the sidechain are rewarded with both shadow tokens, which may be redeemed for tokens on blockchain's primary blockchain (hereafter referred to as mainchain), and/or with the sidechain's native tokens.

We expect that service providers will see little value in a new sidechain's native tokens and will prioritize rewards paid to them in shadow tokens. However, if a sidechain begins to have its own vibrant ecosystem, then service providers may see worth in accepting native tokens. The decision is entirely at the discretion of the service providers—they can locally set the equivalent worth of native tokens and shadow tokens. A person of ordinary skill in the art would understand that the approach described herein closely follows Back et. al's work on pegged sidechains and is incorporated herein by reference.

The terminology used herein is as follows. The mainchain is the parent chain. In general, we expect that the mainchain will be blockchain's primary blockchain. However, a sidechain could create its own side-sidechain, in which case it would serve as the mainchain for the side-sidechain. We may also refer to the mainchain as the parent chain. The sidechain is a chain created by a parent chain.

Native tokens are tokens created by the sidechain. These may be generated as interest from locking tokens, though whether that is permitted is determined by the settings of the sidechain. At the discretion of the sidechain's settings, there may be many types of native tokens.

Shadow tokens are tokens on the sidechain that correspond to native to-kens on the mainchain. Locking shadow tokens cannot produce interest, so that there is always a correlation between shadow tokens on the sidechain and locked tokens on the mainchain. Service providers may be rewarded in either native tokens or shadow tokens as they prefer; in general, we expect that they will heavily prioritize shadow tokens.

Chain Creation occurs as follows. Any client with sufficient coins may create a new sidechain. This client is referred to as the chain creator. The process is as follows: 1. Offline, the client recruits miners and sharders to start the sidechain. 2. The client writes a transaction on the mainchain, specifying: (i) A list of the miners and sharders that have agreed to initially operate the sidechain. (ii) The number of tokens to lock on the mainchain; an equivalent number of shadow tokens will be created on the sidechain. The tokens are locked in a sidechain token pool; they may only be transferred out of this pool by the shadow token redemption process, discussed in Section 4. (iii) The genesis block settings, which specify: (a) The accounts and amounts of native tokens given to different clients. (b) The accounts and amounts of shadow tokens given to different clients. To guarantee service, any tokens given to a service provider begin in a staked state. (c) Parameters for the new chain. 3. Once the transaction from step 2 has been finalized, the selected miners and sharders may allocate tokens to the sidechain pool according to their agreement. 4. Once all service providers have allocated their agreed-upon tokens to the sidechain pool, the sidechain can begin operation. Miners will begin accepting transactions and building blocks.

Note that service providers and the chain creator must stake all of the tokens that are specified in the chain creation transaction. If any of the parties fail to do so before a time-out period, then all tokens may be reclaimed by their owners. However, once the chain has begun operation, the tokens are considered bonded and can only be released through the procedure outlined in Section 4.

Once a chain begins operation, the number of shadow tokens must exactly match the number of tokens in the sidechain token pool on the mainchain.

Initial Shadow Token Allotment. In the genesis block, the chain creator can allocate the creator's own shadow tokens either to the creator's own accounts or add them as staked tokens for the service providers. The latter approach may be useful as a method of offering guaranteed payment to service providers after the chain has been steadily operating.

The creator may specify additional staked tokens for service providers beyond those that the creator contributed; these dictate how many tokens each service provider must bond to the sidechain token pool before the chain can begin operation.

Staking. As part of each chain's settings, there is a staking exchange rate for comparing the value of native tokens vs. shadow tokens. This parameter is used only for determining the comparative power of two service provider's stake when selecting service providers. (This parameter can also be used as a suggested setting for miners when selecting from transactions with transaction fees in both currencies, but the miners are free to select from transactions as they see fit).

We expect that shadow tokens will be heavily prioritized in most new chains. Since the mainchain tokens cannot be unbonded without a proof-of-burn, staking shadow tokens puts a service providers mainchain tokens at risk if they do not perform their duties. Therefore, even if a service provider does not care about the sidechain tokens, they are economically incentivized to live up to their terms of service.

Minting New Sidechain Shadow Tokens. After a sidechain has been launched, new clients may wish to join the sidechain. Assuming the permissions of the sidechain allow the client to join, the client can transfer tokens to the sidechain token pool. Once this transaction on the mainchain has been finalized, the client may request tokens in a transaction on the sidechain.

In more detail: 1. The client writes a transaction on the mainchain transferring coins to the sidechain token pool. We refer to this transaction as the bonding transaction. 2. Once the transaction on the mainchain is finalized, the client writes a minting transaction to the sidechain. The client must specify the mainchain transaction and the number of shadow tokens that should be created in the sidechain for the client's account. If there are less tokens specified in the minting transaction than in the bonding transaction, the additional tokens are minted for the sidechain miner accepting the minting transaction. 3. The miner verifies that the mainchain transaction is finalized and then mints the new tokens.

Redeeming Shadow Tokens. The procedure to cash out shadow tokens on the sidechain and redeem them on the mainchain is as follows: 1. On the sidechain, the client transfers the shadow tokens to an unspendable address. We refer to this transaction as the burn transaction. 2 Once the burn transaction is finalized, the client writes a transaction on the mainchain to release an equivalent number of tokens from the sidechain token pool. We refer to this transaction as the unbonding transaction. The unbonding transaction must specify the burn transaction on the sidechain.

A Note on Finality. Since consensus is probabilistic, there is always some small chance that a "finalized" transaction on the mainchain or the sidechain will roll back. If a bonding transaction or a burn transaction roll back, the supply of shadow tokens will exceed the tokens available in the sidechain token pool. A conscientious client or a client worried about destabilizing the sidechain economy could repeat these transactions without ill effect. In these cases, the shadow tokens become a leveraged asset. As long as the sidechain economy is vibrant and the leverage is not too extreme, we expect that this will not trigger a "run on the bank" of clients rushing to cash out their shadow tokens. Nonetheless, to avoid this issue the finalization period should be extended to ensure that a rollback does not occur. If minting or a unbonding transactions fail, they may be repeated without ill effect. (Of course, the mining network must ensure that these transactions are not duplicates.) A person of ordinary skill in the art would understand that the various alternative options discussed in Back et al.'s paper for addressing rollbacks with sidechains that would apply here.

In one embodiment, 1) There will be public side chains and private side chains. 2) blockchain mainnet community will be responsible for public side chains and blockchain will be responsible for private chains. Private chains will be typical enterprise use cases requiring sales, consulting and so on that requires a face to operate and blockchain is that face. 3) Public chains will not have a single owner who owns the chain and funds the chain. Instead, the main chain community will decide whether to fund a side chain through the community governance process.

4) If a public chain is funded, then the tokens are minted (produced out of thin air) for the side chain just like the main chain. However, the token minting will happen on the main chain to ensure there is no foul play. 5) Minted tokens on the main chain for the purpose of a side chain are periodically transferred to the side chain to a smart contract that is responsible for the payouts to the miners and sharders of the side chain. These balances are tracked on the main chain.

6) A side chain user can burn tokens with the smart contract to redeem them on the main chain. During this time, the main chain verifies that the transfer is within the balance of tokens that the side chain is expected to have and not more than that (as per the original shadow token concept). In one embodiment, user or a distributed application (dApp) pays for transaction on side chain with shadow tokens.

7) Users of the side chain don't need to own the main chain tokens and instead operate completely with just the native token of the chain. In this approach, some of the protocols will behave and work exactly as the main chain where the token is the native token. Only the parts that involve main chain tokens on the side chain will require smart contract implementation that is different for side chain and mainchain. It may be possible to maintain a single code base with branched logic. However, it may also be good to keep them completely separate to reduce complexity and also enable better auditability and maintenance (patch for side chain doesn't require main chain to uptake and vice versa).

In one embodiment, the clients states move over to the side chain, but can interact with the same client id. If the client needs to pay transmit fee on the side chain, they need to bond blockchain token on mainnet to mint shadow tokens on side chain. The miners on the side chain reach consensus based on staked voting and the tokens are staked on the main chain. The staked blockchain token on the main chain earns interest.

This is not expected to dilute the tokens because a public side chain is fundamentally a scalability concept and side chain popularity will increase the token demand offsetting any dilution due to additional minting for the side chain. In addition, given that the side chains are not funded by any single entity and instead sponsored by the main net community, any extreme risk posed by a side chain can be eliminated by shutting off the side chain or changing the reward structure.

Lastly, this concept also allows dApp providers to start off on the main net and if their app becomes popular, the community can decide to give the app a better chance of expanding with a side chain. We can even look at transferring the entire state of the dApp to the side chain so that the initial users of the app can continue to use it. When a dApp is given a public side chain, it will not be allowed to continue on the main net.

IV. View Change Protocol

Long running systems that require no downtime must be designed with redundant components that can be bought down for maintenance with-out jeopardizing the availability of the service that the system provides. Blockchains are no exception, with redundancy found in their many nodes, which are often called miners. The pool of miners that power a blockchain must be flexible and allow for new miners to join and old miners to leave in such a way that the creation of blocks and processing of transactions remains correct and suffers no or minimal downtime.

We present a partially Byzantine fault-tolerant scheme for managing the pool of miners in the blockchain that is appropriate in the setting of a public network where the current view of active miners is at all times discrete, well-defined and public information.

The full process of a miner joining or leaving the blockchain involves an interplay of several actors. Joining miners: 1. Should acquire a copy of and follow changes to the blockchain's ledger state. 2. Must notify the blockchain of their desire to participate in its operations and offer up a financial state for use in blockchain cybernetics. 3. Must join the threshold cryptography-powered random beacon, a key component of the blockchain platform.

Once this process is complete, they are ready to help power the public platform and commencing to do so will get them a financial reward for their contributions. Leaving miners are asked to formally notify the blockchain of their desire to leave and should continue their participation in the running of the chain for a short period of time as the network coordinates for their departure.

Applications and services built with the blockchain have access to a high-quality source of randomness with blockchain's decentralized random beacon. The beacon makes use of threshold signatures, which themselves requires the maintenance of a fixed, discrete list of players. In blockchain, all active miners participate in the random beacon. Thus, the addition or removal of miners from the blockchain involves an update to the random beacon's threshold group. For this, we want fair and decentralized consensus amongst the miners about when and how frequently this occurs, and about who is joining or leaving. If knowledge about the existence of a joining miner is only weakly shared, shared amongst a minority of miners, then it is clear that the blockchain's random beacon cannot be updated successfully to include the new miner. A similar situation also occurs with miners who leave. Additional use for discrete list of active miners include proof-of-stake block creation and notarization. In one embodiment, the distributed key generation process for the random beacon is performed using a backend process so as not to halt the generation of blocks during its run time to provide a significant boost to the availability of the network.

Blockchain transactions provide a solution to the decentralized consensus problem in a Byzantine fault-tolerant capacity. We describe a high-level overview of the whole process of joining and leaving the blockchain as a miner and a technical discussion of the notifications that joining and leaving miners should send to the blockchain. References to state synchronization, financial stake, and the random beacon will be made where appropriate and requirements for soundness of miner pool management are also stated.

Roles. Addition of a miner. The situation of a computer that wishes to join the blockchain as a miner or prospective miner is described below. Service Discovery. On boot, a prospective miner connects to the set of miners and sharders for the network it wishes to join. The set of miners and sharders for the public blockchain networks will be available from a community-managed directory. To connect to a private network deployment, an administrator may specify a custom set of IP addresses where their miners and sharders may be found. In one embodiment, service discovery within private networks can be significantly automated with the integration of popular or existing solutions. For example, integration with Mesosphere DC/OS might be useful for when a party is allocating miners from a hybrid or private cloud resource pool.

Registration. Since the current view of miners in a blockchain is public information, any prospective miner must publish its IP address. Since also the moderation of troublesome miners and an incentive for good behavior is approached with a proof-of-stake model, any miner must put up some of its tokens as stake. (Alternatively, a miner may opt to lock some of its tokens to populate this staking fee, covering the fee for "free" in that their total count of tokens does not actually reduce.) These needs can be met by having a prospective miner issue a special type of transaction to the blockchain, called a register transaction, that contains the prospective miner's IP address and an amount of tokens that it wishes to stake. As is standard, this transaction also includes the address of a wallet controlled by the entity which issued the transaction—in this case a wallet controlled by the prospective miner. Once this transaction has been processed successfully, the prospective miner is considered a registered miner. The stake the miner offers during its registration will be returned to it at the time of its deregistration, plus or minus any rewards and punishment it received in the meantime.

Ledge state synchronization. A prospective miner downloads and follows updates to the distributed ledger state by requesting such information from the sharders. In the common case, a large initial download from the network's sharders that contains a copy of the ledger's state as of a recent checkpoint in the blockchain's history, and then either a series of direct state deltas or the sequence of blocks that were produced after the checkpoint, again drawn from the sharders. Sharders share new blocks that the network creates with registered miners with a gossip protocol. Sharders receive no compensation for this work, but with the staking that is required of all registered miners, the large numbers of concurrent requests for this information will be partially deterred. Additional actions would be applying for candidacy, view change scheduling, handoff mode, creation of new random beacon and joining in on the creation of blocks. Candidate miners could begin receiving notarized but not yet finalized blocks from the miners in the current view.

Removal of a miner. Applying for removal. This requires view change scheduling. Begin with Handoff mode. Monitor the blockchain for new blocks. If we are sent a block without a view change record, discard it. If ware are sent random beacon shares, it means the view change failed and we have not left yet. Log this for the administrator and keep participating to avoid losing stake. Try to leave again.

Once these steps are done, the leaving miner is considered registered but not part of the current view and most of the leaving miner's state is returned to them. The leaving miner may opt to stay registered or may unregister at this point. Staying registered will allow them to continue to follow all blockchain state changes through the gossip that occurs between all registered miners, while unregistering will release the remainder of their stake. Regardless of which they choose, their machine is now safe to power off.

Continuing miners. Miners who are in the current view—a set of miners which logically excludes joining miners—and who are not attempting to leave, are called continuing miners. Continuing miners authorize and facilitate changes to the miner pool and are involved in all things concerning stake. A continuing miner processes transactions related to miner registration and deregistration and transactions related to view changes. They must also participate in the creation of each new random beacon if they wish to remain as continuing miners. Handoff mode requires that continuing miners enter handoff mode just like joining miners. Creation of new random beacon requires the participation of each miner who will be in the next view. Continuing miner will do their best to be present for this. Joining in on the creation of blocks also comes in play. After the new random beacon is created, continuing miners resume block creation with a new value for the current view composed of whomever is included in the new random beacon.

Figure 11:
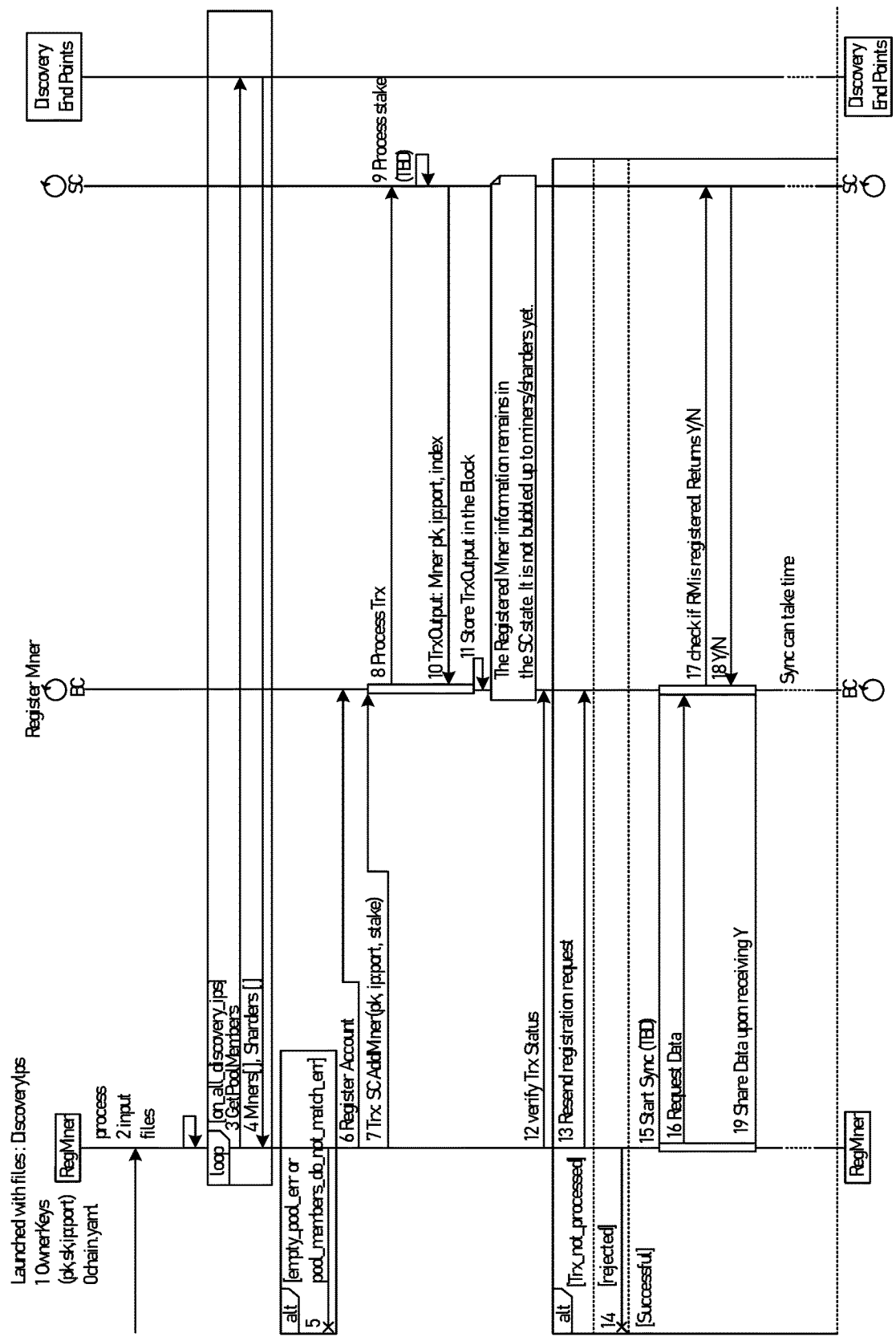
FIG. 11 shows different messages exchanged with view-change protocol when registering a miner.
Figure 12:
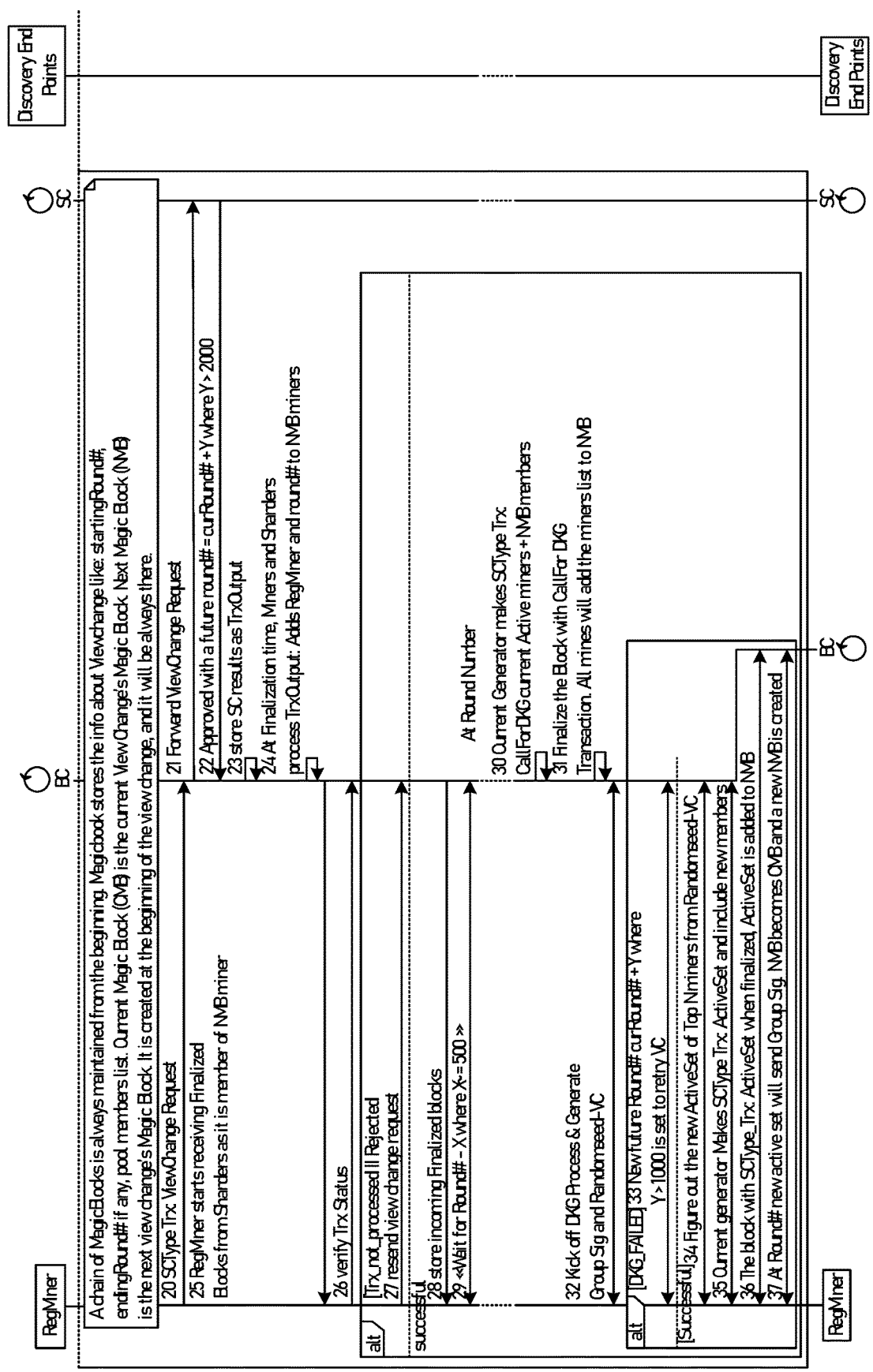
FIG. 12 shows different messages exchanged with view change protocol after a miner is registered.

Details as described in FIG. 11 and FIG. 12. FIGS. 11 and 12 show the different messages occurring within view change protocol. Miner pool candidate management. Define the current view of active miners to be the set of miners who generate blocks and participate in the random beacon, and define the candidate set to be a set of miners who have said they are ready to join the current view. View change record is a field in the header of a block, not a transaction. Current view is a field in the header of other blocks and contains the host of the most recent block with a view change record. View change block is a block with a view change record.

To become a candidate for inclusion in an upcoming view, the registered miner submits a transaction to the blockchain that will add it to the candidate set. To be removed from the candidate set, a leaving miner must submit a transaction to the blockchain that will remove it from the candidate set. This will cost some number of tokens, although by utilizing the blockchain token rewards, a prospective miner has the ability to cover some or all of the cost by instead locking some of their tokens for a fixed period of time, potentially making this transaction "free."

View change scheduling. There is a latency between a miner being added or removed from the candidate set and such a change being mirrored to the current view. This latency is called the view change latency, is defined to be some number of rounds, and is considered to be a parameter of the blockchain. Different blockchains may have different view change latencies if they wish. For correctness of the remaining steps, the view change latency should be at least as large as the time to finality of a block. For every round where at least one change is made to the candidate set, miners locally schedule an operation called a view change to occur after a view change latency period. Different methods can be used to coalescing of several join and leave operations within a single view change.

Handoff mode. When a miner begins a view change, they halt their participation in the blockchain. This means that if they were in the current view, they do not begin generating a new random output for the current round, they do not generate blocks for the current round, and they do not verify blocks for the current round. If they are sent a block proposal for the current round at this point, it is discarded. At this point, an attempt is made to change the miner pool to the set of miner pool candidates that occurred so many blocks ago. If a further change had occurred in the miner pool candidate set since then, it is not acted upon until said number of rounds have expired from when it was made. Different methods can be used for continuation of notarized block sharing. As miners reach the beginning of the round that a view change occurs on, they continually share the notarizations they have seen from the previous round. This helps other miners who have not yet entered into the round to catch up.

The blockchain prioritizes consistency over availability. When availability is jeopardized, the view change will be aborted. Blockchain can use different methods to detect and recover so that the blockchain usage does not come to a complete halt during a network partition. The blockchain also applies different security protocols consistent with the view change protocol to protect the platform.

There is a high resource cost for sharders when they service ledger state sync requests. That is why you have to stake some tokens to get access to it, even though this amount is lower than the amount to become a full miner. For use as a defense against this attack, staking is far from flawless, but it should serve to raise the bar for an attacker which is itself valuable.

Recovery methods include recovery from not being included in the new random beacon group. Active miners may wish to collude and prevent other miners from joining. This is prevented if a majority of miners or supermajority of miners are host and not colluding. Either a joining or leaving miner is prevented from joining or leaving until the network partition in play is resolved, or a minority of miners who are partitioned will be kicked out at the next view change. If a miner is kicked out by accident, he may issue a request to join back in once they reconnect and discover they were kicked out.

In one embodiment, a global state synchronization can be achieved as follows. A blockchain needs to support the ability for a miner to join or drop-off and rejoin at will. This may be deliberate or due to system failures. When this happens, the joining miner needs to sync up the state before it can proceed further. The global state is stored in what is called as Merkle Patricia Trie (MPT). It is a persistent and secure data structure. The persistency allows accessing prior versions and the security is achieved by storing the keys as hashes of the content. Ethereum is the first major blockchain to popularize this data structure. While the data structure is standard, how it is implemented to support various activities such as pruning the older versions to limit the storage requirements and synching the latest state are implementation specific. blockchain has a novel implementation approach that allows the miner who join and lack either partial or the entire state up to that point to sync up in an incremental manner while simultaneously contributing to the blockchain activities in a best effort manner.

In case of Ethereum, when a node joins the network, it first synchronizes the entire state up to the latest block (which is a moving target as blocks get generated as time passes) and only then are able to start contributing. The blockchain platform described herein uses an incremental sync approach which is explained below. MPT is a tree whose path is the client ids (wallet ids) and the leaf node contents are the token balances. When a miner joins, it starts receiving the newly generated blocks for verification. The miner tries to verify them as if the state is already synced up. During the verification process, if it is not able to resolve the state, it will fail and will not provide a verification ticket to the mining network. When it sees a notarized block, it will request for the partial state changes because of that block from the mining network. Any honest miner or sharder can provide the partial changes. These partial changes themselves represent a partial MPT with a root node hash which is included into the block's hash. So, the node can ensure the validity of the provided changes by verifying the state change's root hash is used to compute the block's hash. Since the block itself if notarized, it can trust the state changes and sync them up with the local database of MPT nodes. Similarly, when it is the turn for the miner to generate a block, he would assume he has all the state and start processing the transactions. Any transaction that fail the state validations will be skipped. If he eventually manages to generate a block using the partial state, then the resulting state computations are guaranteed to be valid that any other miner with full MPT can validate and confirm.

This process of block verification and generation will continue and partial states are synched when the state validations fail. Over time, this partial state accumulates and starts covering as much of the latest MPT as possible. After sufficiently long time, the entire MPT would be synched. However, one requirement for this to happen is that there is a send/receive transaction from a given client so that its state nodes changed in the MPT since the miner has joined and hence they get synched as partial state. However, this may not be practical as some clients may not do transactions often. Waiting for them to submit transactions and leaving the MPT in partial synched state has the risk over time of all miners losing the associated information. To deal with this, blockchain also uses the pruning process to do the sync. When a miner that sync up and fails verification because it doesn't have the state, will wait for a notarized block, process it, and request for the partial state changes of that block from the mining network. This way as notarized blocks come in, the miner sync up on the fly. A miner can still generate a block by only including transactions that he has the states for in order to generate a valid block using his partial state.

The blockchain MPT pruning process is as follows. A miner would walk back by a configured number of blocks from the latest finalized block, say, 100. From that prior block, every node that is reachable will be marked to be retained. Then sweeping through the key/value pairs in the database, any node that is not marked for retaining will be deleted. Essentially, this is similar to a standard garbage collection algorithm doing mark and sweep.

In order to accommodate the partial state, the pruning logic is enhanced as follows. During the marking process of tracking all the nodes that need to be retained, all the missing keys are collected and they are fetched from the network in batches. Since the key is the hash of the node value, the nodes retrieved can be independently verified to be correct. This process allows synching up state that belongs to wallets that don't update frequently. Using the above process of synching both block level changes and on-demand missing sets of nodes, blockchain miners are able to make contribution to the blockchain while synching up the global state.

To prevent an unused state over a long time (say a wallet is not used for a year) being lost on the miners (assume all of them went down at least once within a year and lost that wallet data), the blockchain platform uses a discovery process during the pruning process to make sure all states are accounted for, regardless of how active the wallet state is. During the pruning process of tracking all the nodes that need to be retained, all the missing keys are collected and are fetched from the network in batches. In one embodiment, discovery of missing keys and storing of state occurs periodically using a background process that scans for missing nodes. In one embodiment, a node can repeatedly sync the partial states across rounds of notarized blocks to incrementally get to the entire state. In another embodiment, the blockchain platform syncs up to consistent state during pruning.

V. Determining Finality of Transactions Protocol

Deterministic finality can be achieved applying the ideas similar to that of the Hashgraph to a blockchain finality protocol.

The main reason for probabilistic finality is that everyone discovers a finalized block locally based on the blocks they have accumulated. So, if the network of a miner has a temporarily partial failure (that is temporarily receive messages but not the other), it is possible that the miner might make the finality determination based on partial data. This is the source of the non-determinism.

Traditional distributed consensus algorithms add an extra round of message passing as acknowledgement to make the consensus deterministic. However, that adds additional time to the steady state finality of each round.

Hashgraph takes a novel approach to this problem. They assume every miner builds his own chain and in the process also endorses randomly the chain of another miner. As a result, at any given time, a miner is directly endorsing one miner and indirectly endorsing other miners. So, if we walk sufficiently back in this partially ordered sets of endorsements, it is possible for the latest endorsed event of a miner to indirectly endorse the chains (not necessarily up to the latest point) of more than 2/3rd of the miners. At this point, the latest event which is seen by those 2/3rd endorsements and below are deterministically finalized.

blockchain uses a similar concept but to a single chain instead of multiple chains each of which can grow like in Hashgraph. It is explained below. In blockchain, there are three blocks that are of interest. They are: 1. The block that is being added to the current round. 2 The block that is probabilistically finalized using a variant of dFinity algorithm. 3 The block that is deterministically finalized using a logic explained below. It should be noted that the deterministic finalized block lags the probabilistic finalized block which lags the current round block.

When a miner receives a block for a round and it is from a valid generator for that round, it is added to the local cache of blocks. During that time, the chain from that block is walked back till the previously identified latest deterministic finalized block. For each block in between, it is added to unique extensions map of the block if the miner of the current block hasn't extended any block between this intermediate and current block. After sufficient progress of the chain, at some point each block that is probabilistically finalized will receive enough number of unique extensions, indicating that sufficient number of miners are working on top of that block. At that point, the block becomes deterministically finalized. The threshold used for deterministic finality will be the same as the threshold used for notarization of a block. For example, for a 3*f+1 miners with f number of Byzantine miners, there should be more than 2/3rd unique block extensions for a block to be considered finalized deterministically.

Figure 10:
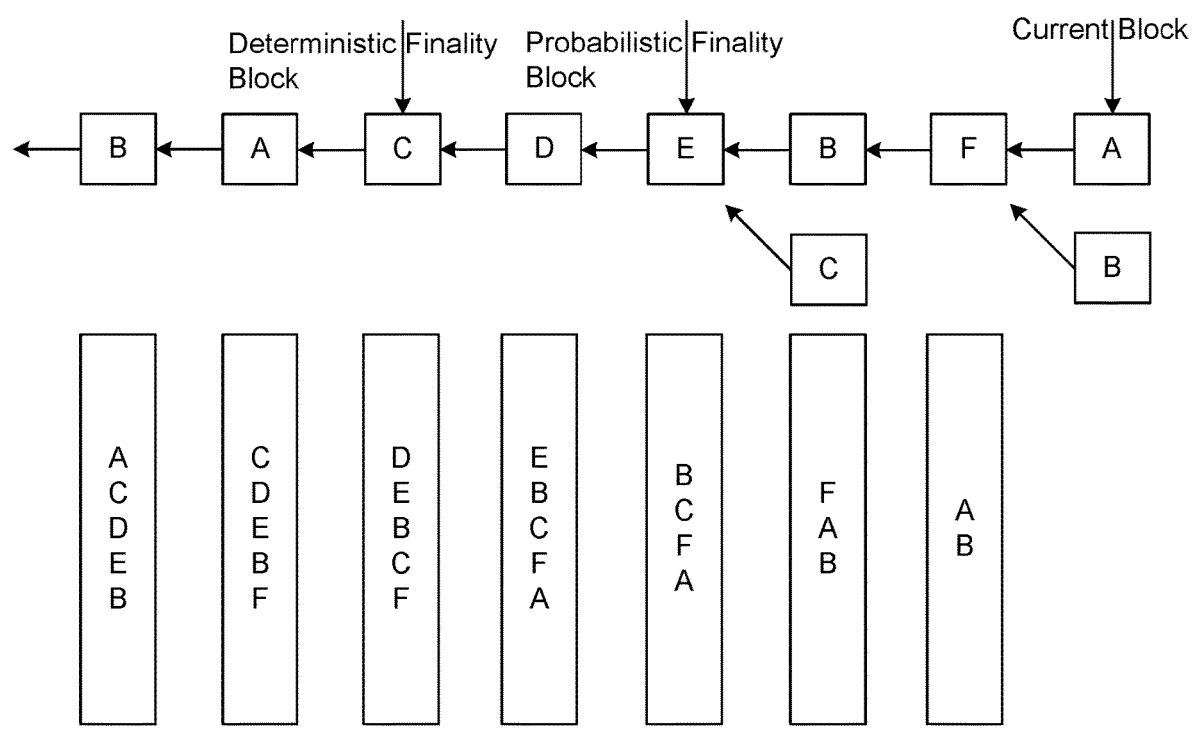
FIG. 10 shows deterministic finality determination based on one embodiment.

FIG. 10 indicates the above explained process. The letters in the block indicate the miner who generated the block. The letters in the rectangular boxes below represent the unique chain extension endorsements for those blocks. In the current round, blocks generated by miners A and B are processed A followed by B without any loss of generality (w.l.o.g).

Let's assume that receiving 5 unique extensions is considered as the threshold. As soon as block from A is received in the current round, the block by D becomes finalized deterministically as A gives an extra unique endorsement. Similarly, when block from B is received for current round, the block by E becomes deterministically finalized moving the local view of the latest deterministic finalization from C to E.

In one embodiment, the deterministic finality protocol can be reduced to brining finality in only one round. (a) Each miner runs the Dfinity finalization routine and broadcasts an intent ticket (intent to generate a block from a previous block) at the beginning of a round. (b) Each miner tally the intent tickets and determine on their own what the previous deterministic block is. This is the deterministic finality of the previous round's block. (c) The generators do not generate until they determine the previous round's block from which to extend their block, and until they receive enough VRF shares to generate a random number and determine if they are the generators for the round. (d) The verifier will verify the highest ranked generator unless they receive the block late or is not extended from the deterministically finalized block. (e) So, then we can achieve a deterministic finality after one round assuming less than ⅓ is Byzantine, where a round is defined to be between two consecutive generation events, since both are equivalent. (f) The deterministic finality is not dependent on any artificial network delay condition, but based on enough intent tickets, which is asynchronous. (g) This enables a faster finality and a realistic deterministic finality than Dfinity, which is network dependent.

VI. Applications of Self-Administering Protocols

The systems and methods of a consensus protocol on a blockchain platform allows automated finalization of different rounds of transactions by tally voting using a dynamically selected active set providers from a dynamically selected set of pool participants. A client is an end-user with a computing device who initiates the requests and wants to commit transactions on the blockchain platform. A miner is the guard on the blockchain who is also performing the operations and administrative tasks on the blockchain. A blobber or a sharder uses a computing device that processes the applications on the blockchain platform. Given that there is no official authority or decision-making hierarchy to finalize different rounds of transactions, using an automated well-established tally voting and verification process that changes dynamically with each round is an efficient way of coming to a consensus decision for a given round.

Provider Selection happens every nth Round described above. Provider Selection occurs for only Miners, Sharders, Blobbers. Initially Active set Max size <=Pool and there is no Provider Selection process.

An active set lead is assigned from the active set providers to begin and finalize the consensus protocol. The different stages of the consensus protocol are: (i) Generate; (ii) Verify; (iii) Tally; (iv) Finalize. The miner assigned to generate a block for a specific round, sign, and send it to all the miners. Generators are chosen randomly from the Active Set. A miner assigned to verify the block, sign, and send Verification Ticket to all the miners. A miner collects and counts Verification Tickets, and sends a Tally Ticket to miners and sharders. A miner and sharders run finalization routine based on chain weight to determine finalized block for the previous round. As a result, block finalization time is 3× steady state finality.

The sequence of events can be described for a round as follows, were a block is produced per round. A miner generates random number based on VRF and sends to all miners after Finalize is complete, wherein timeout is defined as wait for median network latency. To start a new round a miner Sends a Random Number to all Miners. Receiving Miners decide whether they generate. Generators send blocks to all miners and sharders. Miner who started the round times out of waiting for responses. Miners verify and send Verification Tickets to generators only. Generators tally tickets and send Tally tickets to all miners and sharders after reaching threshold. Finalize block of previous Round by waiting for 2 timeout periods to reduce tail of multiple histories.

A new round is started after Tally tickets are received. After N rounds, a new active set event occurs to dynamically change the active set providers by requesting Pool participants submit stake transactions to take part in the NAS event. Provider Selection is based on Stake and Reputation, that is sort by Stake (i.e. staked tokens) and Reputation weights (i.e. reward tokens) for each provider. The weights can be set at the genesis and changed through governance later. Dynamic reassignments and to ensure the group actively rotates, rotate out a maximum of 10% of the Active Set every NAS event to reduce Sync load. Providers that exit the Active Set then submit transaction to unlock stake. Sync Period for New Providers is equal to k rounds. Sharders may take longer than Miners for the sync process. Blobbers are not part of Provider Selection as they are based on a contract established with the User.

In one embodiment, the role and function of a sharder are described in further when operating within the consensus protocol on the blockchain platform. The generators send blocks to all sharders. Only a finite group of m sharders store data for a particular round out of the total sharders in the Active Set. This is done to scale the storage of blocks effectively. Blockchain is configured for the number of sharders that needs to store each block. For each round, which sharders need to store is determined using an algorithm similar to "consistent hashing". The idea here is that the block's hash is used to create a mapping between the hash and the sharders client id. Per this mapping, the top N sharders are used to store the block. The advantage of this approach is that when a sharder leaves, all the blocks the sharder was storing can be redistributed uniformly to the rest of the active sharders. When a new sharder joins, it would be optional whether to store the prior blocks or not. Syncing old blocks become more important when a sharder leaves the network.

In one embodiment, the provider selection within the consensus protocol on a blockchain platform is described as follows. The blockchain platform decides selection based on a Manual selection or Stake based. A staked selection is when a provider locks a portion of its tokens for a period the stake is active indicating interest by the provider to participate in a given round. Selection happens every nth Round unless initiated by Miner (e.g. 5% drop in signatures or number of sharders). The Selection Protocol is described as All Providers (Active Set and Pool) expect selection to happen every nth round. Since Pool do not get any Reward, they can wait to participate. Pool can also watch for Miner initiated selection if there is a drop in miner, sharder, blobber participation in the Active Set. Pool participants sends a transaction on the nth Round-10 (or some number) to stake their tokens for consideration of selection in the lottery. On the Nth round all miners send their random numbers to every miner in the Pool. The current Active Set orders the numbers and permutes them based on their stake. If miner is selected and is a part of the Active Set, no action is needed from the miner. If miner is a new member of the set, the miner needs to start the Sync process. The Sync process is done over 10 rounds or however long it takes to sync up with all the current states new blocks and transactions from clients and miners (in the case of gossip protocol). This overlap period can be implemented where the outgoing Provider is synced up with incoming Provider, and they can be paired up based on stake, and such pairing can be registered on the blockchain. After n+10 rounds there is a new active set (NAS) block or a required view change identifying new Providers. All miners who are not selected can submit transactions to unlock their stake after NAS block is on the blockchain.

In one embodiment, the consensus protocol uses configurable signatures. Blockchain can configure the Tally requirement to be Stake based AND/OR Count based. Stake based approach offers higher security and reputation to the network. Count based also means one or few high-stake miners cannot control chain progress, unless its set up to be a fully permissioned on the blockchain.

In one embodiment, a Governance Protocol is used as follows. Any change in protocol is based on Stake and can be initiated by a transaction by anyone to a Vote Wallet, which is a special keyless address. The initiator will need to stake their tokens to get the Voting process started. Voting can happen every n rounds on the highest staked agenda. Their needs to be a minimum number of votes (initially set to 100) required for the return of staked tokens. Stakeholders look at the proposal and vote by sending a transaction to the Vote wallet. After a time period of n blocks, all Votes are tallied based on stake at the time of execution, and the proposal is either denied or accepted. Example of changes via Governance protocol—client token hold per 100 transaction, maximum active set size, client multiplier, blobber multiplier, maximum pool size, increase of reward pool for current year, number of initial votes required for return of staked tokens.

Different embodiments described herein include components or structures to perform the described functionality. A "component" or a "module" as used in this invention disclosure, includes a dedicated or shared processor and, typically, firmware or software modules executed by the processor. Depending upon implementation-specific or other considerations, a module can be centralized or its functionality distributed. A component or a module can include special purpose hardware, firmware, or software embodied in a computer-readable medium for execution by the processor.

In one embodiment, FIG. 1 depicts a diagram 100 illustrating an example of a blockchain platform based on a consensus protocol action model for implementing different distributed applications. In the example of FIG. 1, the environment includes a first client system 110-1 through an nth client system 110-n, network 140, active set provider system 120-1 through an nth active set provider system 120-n and pool participant system 130-1 through an nth pool participant system 130-n. In an implementation, both the active set provider system 120 and pool participant system 130 includes one or more miner, sharder or blobber computing systems.

In one implementation, the active set provider system 120 includes components to process operation requests from the clients. In one embodiment, an active set provider system 120 includes a miner, a sharder or a blobber. At a given time, there may be an active set provider group of miners as well as a separate group for sharders or blobbers. In one implementation, a sharder also is included in the mining network. In one implementation, the pool participant system 130 includes components to fulfill application requests that are initiated by the client 110 and approved by active set 120. The groups of active set providers and selected pool participants changes dynamically when a new active set event is triggered.

Network 140 can be different wireless and wired networks available to connect different computer devices including client and server systems. In an implementation, network 140 is publically accessible on the internet. In an implementation, network 140 is inside a secure corporate wide area network. In an implementation, network 140 allows connectivity of different systems and devices using a computer-readable medium. In an implementation, the blockchain platform allows users on the client system, the blobber or the miner to have customized applications and operational framework.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

Figure 2:
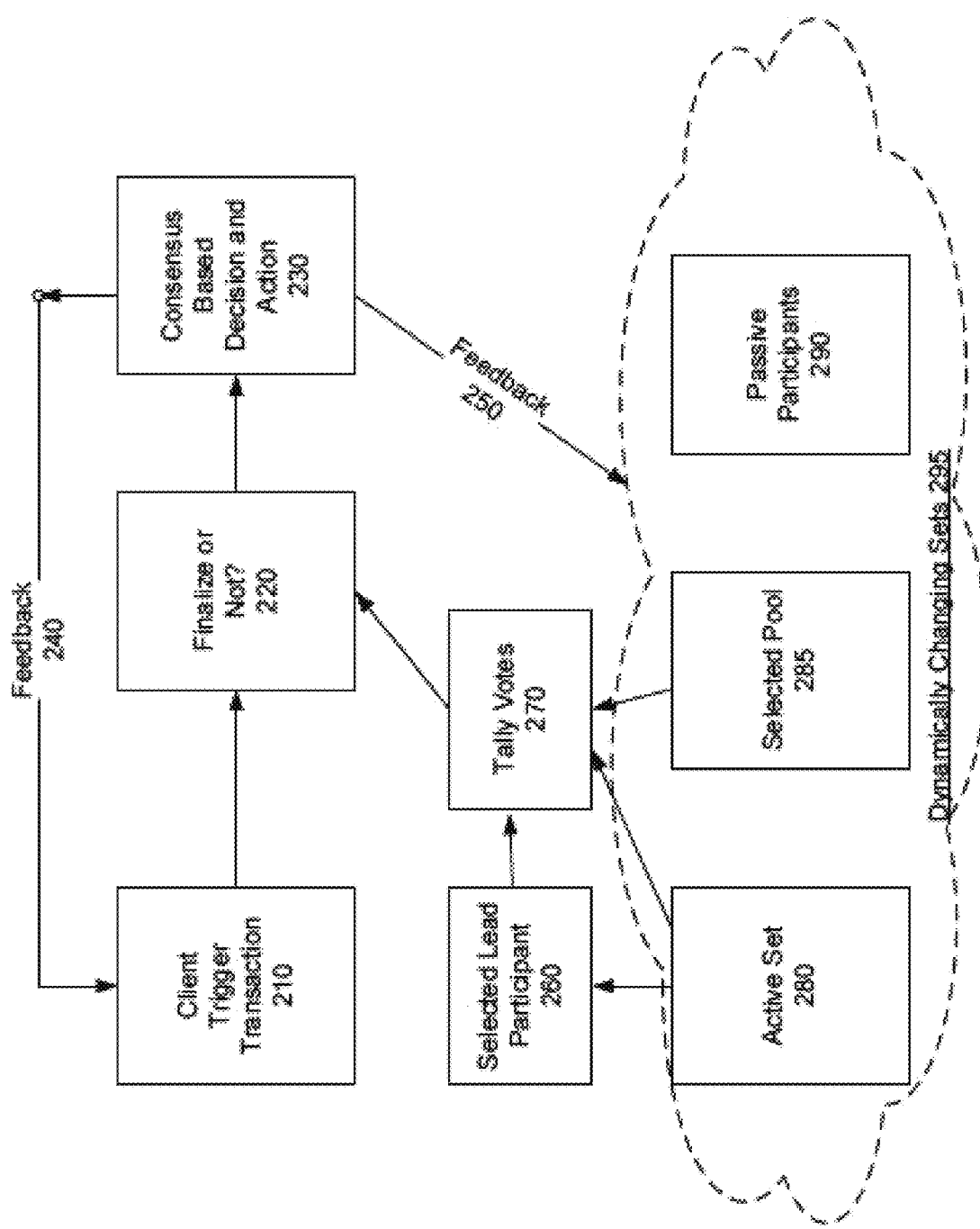
FIG. 2 shows a diagram depicting data flow of information from different players, according to one embodiment.

FIG. 2 shows a diagram depicting flow of information from different players, according to one embodiment. The consensus protocol involves automated and decentralized consensus or decision as to whether to finalize or not finalize a round of transaction. A client is the recipient of the final decision and has an interest or stake in getting the round to finalize. A client triggers the transaction finalization at 210 after exchange of messages and data on the blockchain platform. Client is requesting automated decision as to whether to finalize or not at 220. The consensus question is posed to the block chain platform and gets feedback from an active set of providers 280 who are selected from a group of selected pool participants 285 and for a given round passive participants who have not indicated an interest at 290 are not included in the consensus decision. The very selection of the active set and selected pool participants 295 is dynamic and randomly based on reward tokens, also known as counts or staked tokens, i.e. allocated interest from the participant to get selected in the pool. Using different algorithms, including random selection or taking turns in round robin fashion, a lead participant 260 is selected from the active set. The selected lead participant 260 generates a signature and requests verification using tally votes 270 to all of the pool participants for the given round. Verification from the tally votes 270 is fed into the consensus decision 220. Based on whether a tally is reached or not and any other factors the blockchain platform considers important, a decision is made at 230. The decision and any corresponding subsequent actions are then sent as feedback 240 to the client and feedback 250 to the active set and pool participants.

Figure 3:
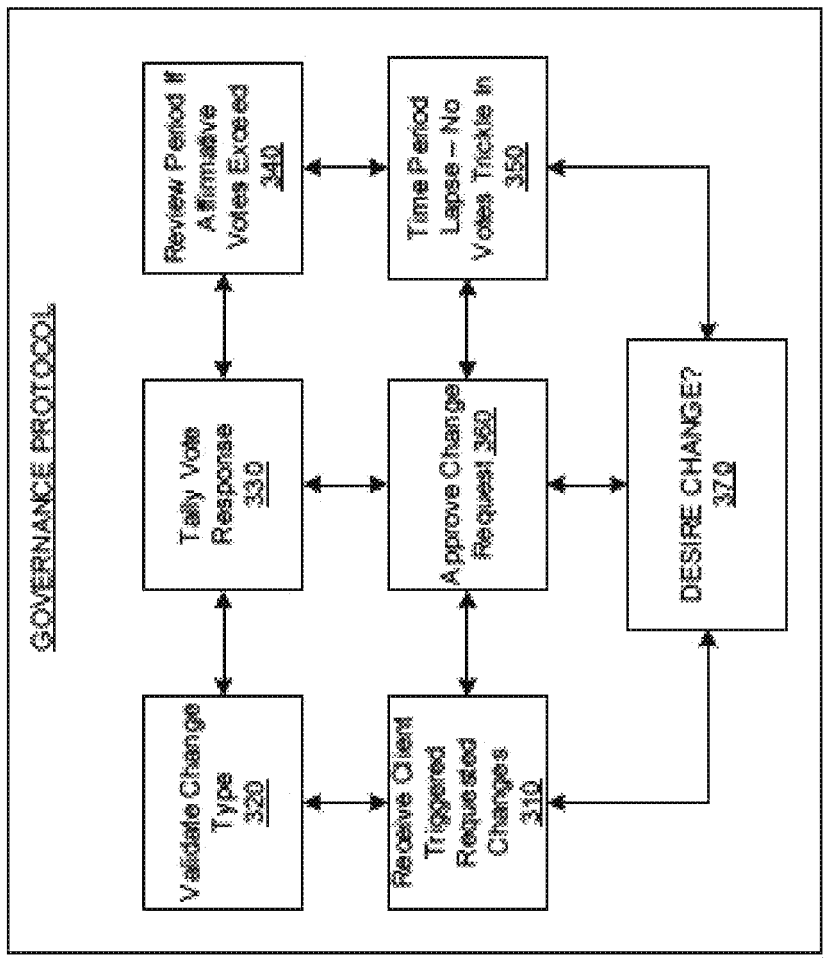
FIG. 3 is an exploded view of governance protocol provider computing system illustrating different modules and functions, according to one embodiment.

FIG. 3 is an exploded view of a governance protocol provider operating on the blockchain platform. The different components or modules included in the governance protocol provider system includes a module to receive change requests 370, receive client triggered requested changes 310, validate change type to be configuration, moderation or feature request 320, tally vote response 330, enter into review period if affirmative votes exceed negative votes 340, set time period lapse when no votes trickle in 350, approve change request 360 if affirmative votes continue to exceed negative votes. In one implementation, the governance protocol provider can reject a request from the blockchain platform if the client making the request does not own sufficient tokens. In one implementation, the governance protocol provider rejects the change request before tallying for votes if the requested change type and change parameters are not validated with a set of approved change parameters. In one implementation, the tally votes have to be 2/3 majority for a substantial change to be approved. In one implementation, the tally vote is based on majority voting. In one implementation, there is a minimum number of responses required before a decision can be finalized.

Figure 4:
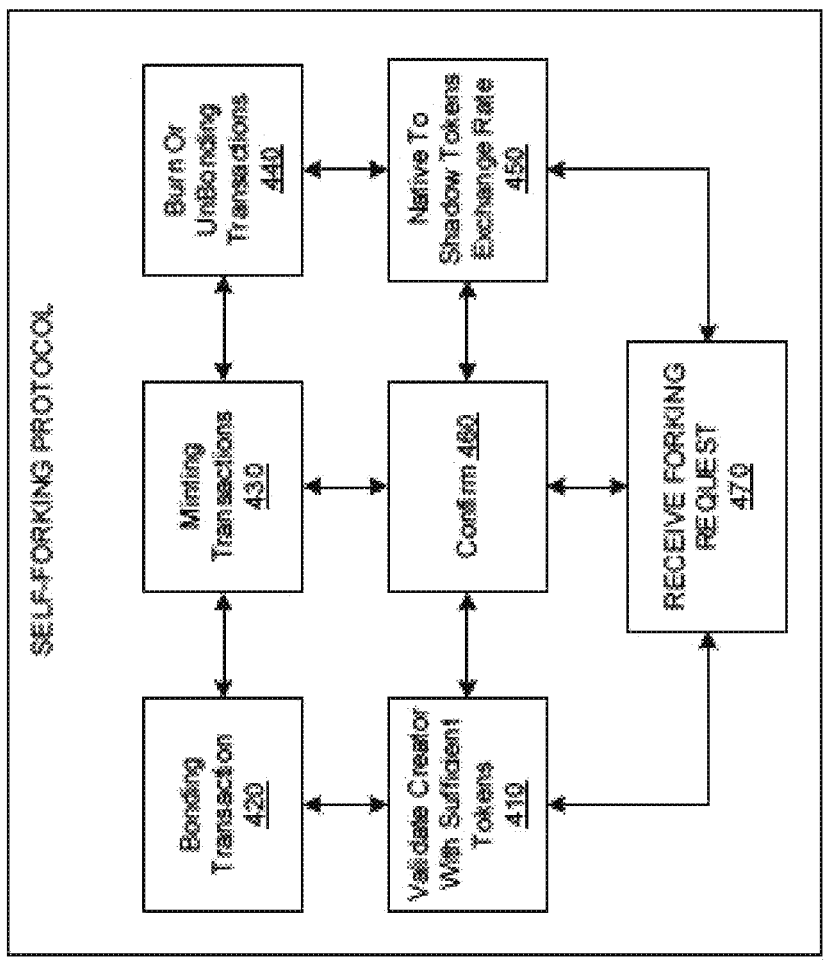
FIG. 4 is an exploded view of a self-forking protocol provider computing system illustrating different modules and functions, according to one embodiment.

FIG. 4 is an exploded view of a self-forking provider system on the blockchain platform. The different components or modules included in the self-forking provider system includes a module to receive forking request 470, validate creator has sufficient tokens to create a side chain 410, bonding transaction 420, minting transaction 430, burn or unbonding transactions 440, native to shadow tokens exchange rate 450 and confirm 460. In one implementation, when a side chain creation is triggered on the blockchain platform, the side chain parameters are based on its user set preferences. A side chain can become a main chain for another side chain. In one implementation, a side chain is merged back on to the main chain for low activity.

Figure 5:
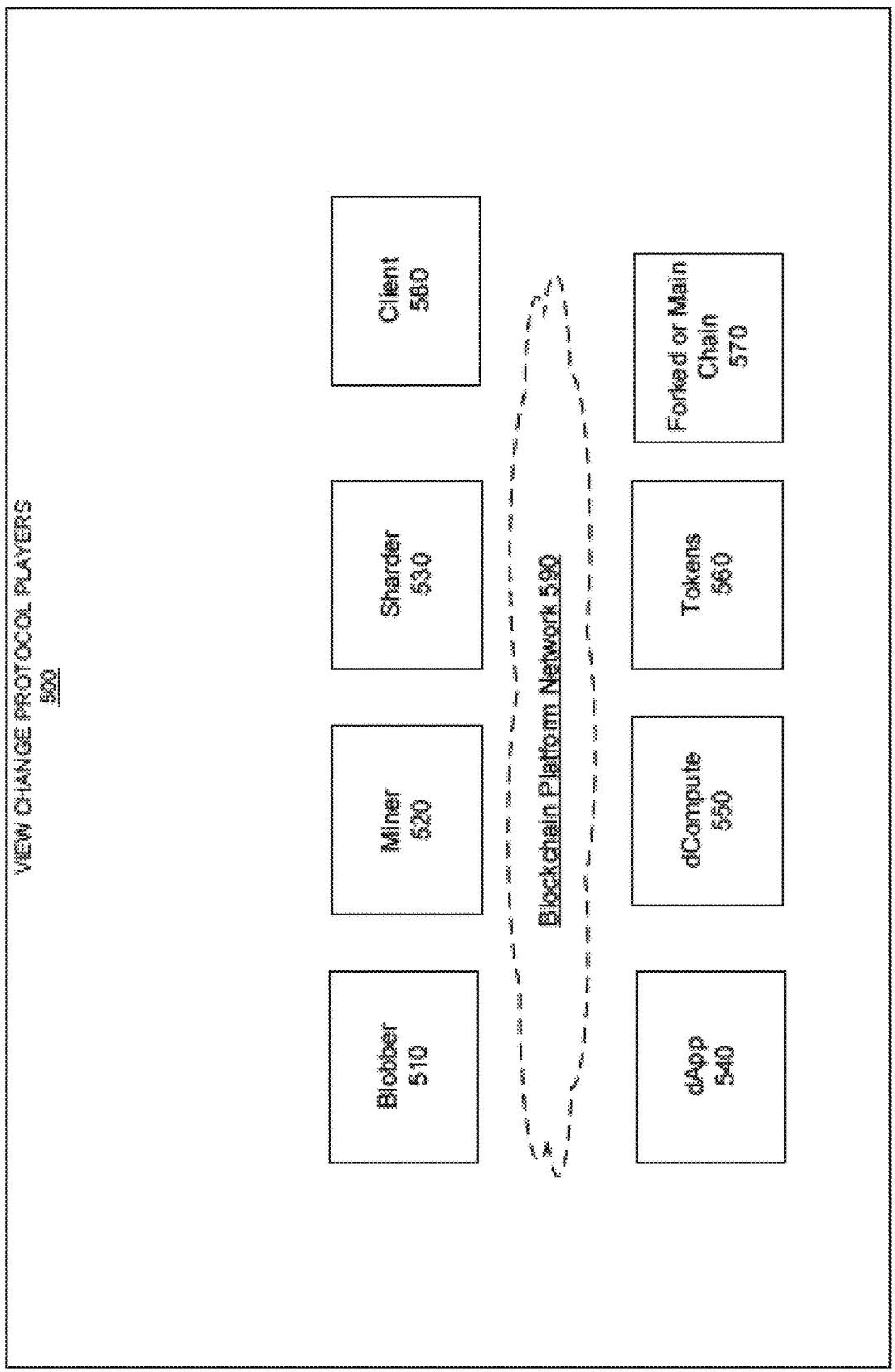
FIG. 5 shows the different role players and components for a view change protocol in a blockchain platform, according to one embodiment.

FIG. 5 shows the view change protocol players and some of the blockchain platform components 500. A blobber system 510, a miner system 520, a sharder system 530 and a client 580. The blockchain platform network 590 resides on the network 140 of FIG. 1 and includes methods and components to authenticate different players and verify messages, content and data using encryption, signatures and other verification methods. Distributed applications dApp 540, dCompute 550, Tokens 560 and Forked or Main chains 570 are different components of the blockchain platform. In one embodiment, tokens include native tokens for side chains, shadow tokens translated from side chain to main chain and regular tokens staked on the main chain. In one implementation, the main chain has miners and sharders as providers and the forked chain has blobber and client exchanging messages.

Figure 6:
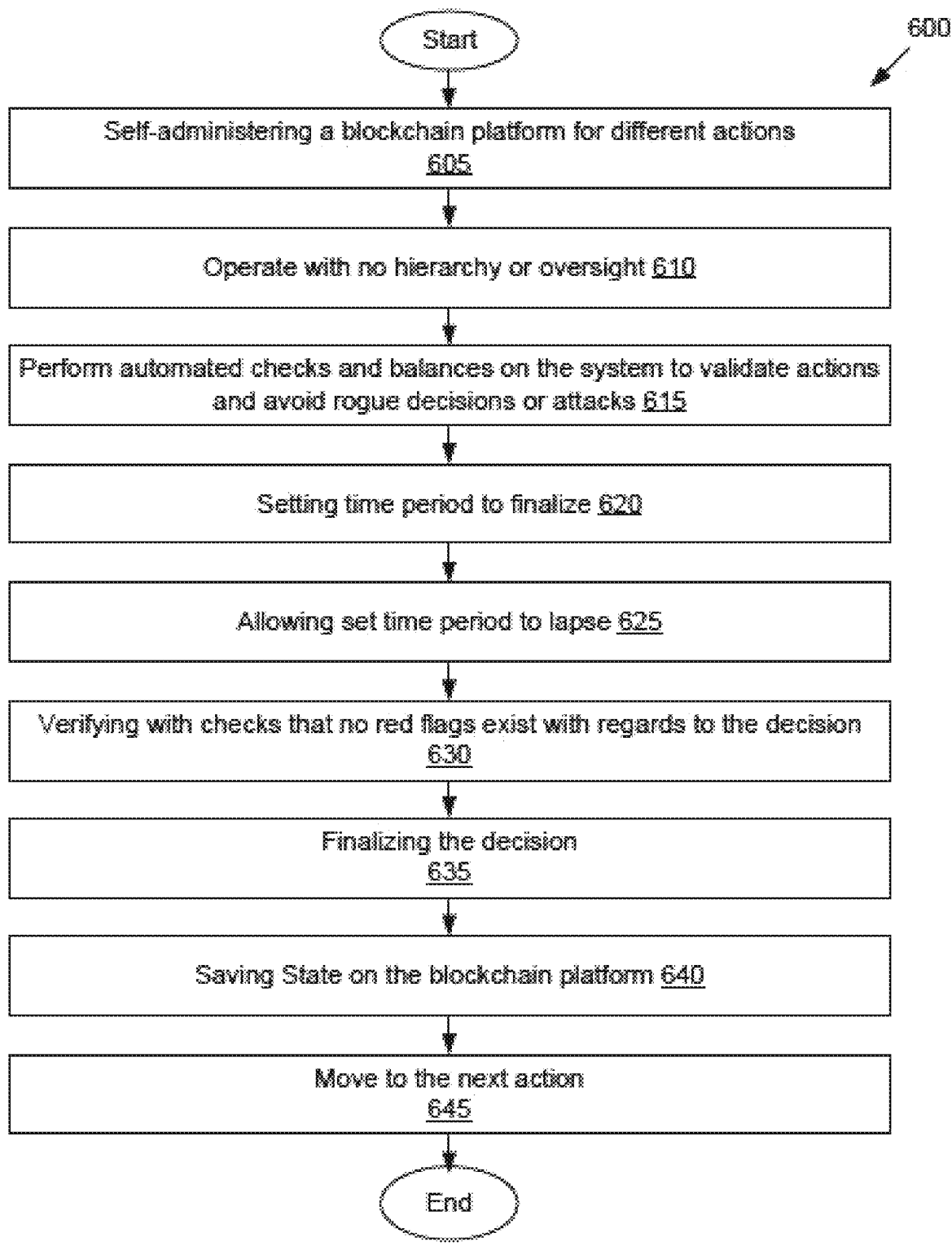
FIG. 6 shows a flowchart illustrating an example of a method of a self-administering protocol on a blockchain platform.

FIG. 6 depicts a flowchart 600 illustrating an example of a method of self-administering protocols for a blockchain platform. The flowchart 600 is discussed in conjunction with the blockchain platform environment shown in the diagram 100 in FIG. 5. At block 605, self-administering a blockchain platform for different actions begins. At block 610, the blockchain platform operates with no hierarchy or oversight. At block 615, the blockchain platform performs automated checks and balances on the system to validate actions and avoid rogue decisions or attacks. At block 620, a time period is set to finalize the triggered action. At block 625, the set time period lapses. At block 630, verifying with checks that no red flags exist with regards to the decision. At block 635, the decision is finalized. At 640, the state is saved. At 645, the next action is processed.

In broad embodiment, the invention is systems and methods of self-administering protocols for a blockchain platform includes self-assessed dynamic decision making that promotes the growth of the blockchain platform with desired actions from its providers.

Figure 7:
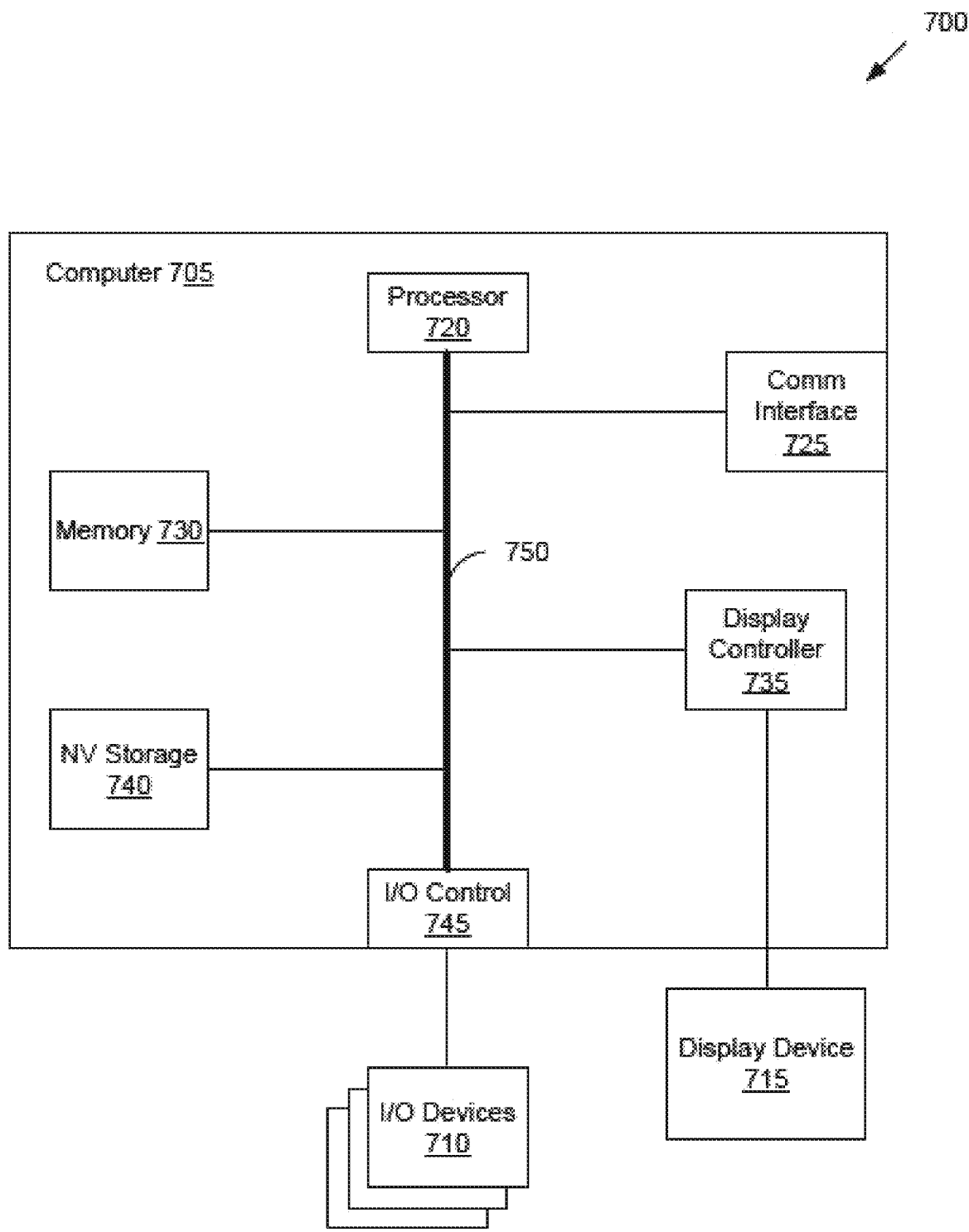
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, client system 110, an active set provider system 120 and/or selected pool participant system 130 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

Several components described here, including clients, servers, and engines, can be compatible with or implemented using a cloud-based computing system. As used here, a cloud-based computing system is a system that provides computing resources, software, and/or information to client systems by maintaining centralized services and resources that the client systems can access over a communications interface, such as a network. The cloud-based computing system can involve a subscription for services or use a utility pricing model. Users can access the protocols of the cloud-based computing system through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method that includes a processor and a local storage device accessible by the processor for efficiently adopting a blockchain governance proposal enabling self-governance on a blockchain platform comprising:
responsive to receiving the blockchain governance proposal from a client, by the blockchain platform, creating an accept proposal pool and a reject proposal pool;
staking tokens, by the client, into the accept proposal pool;
staking tokens, by blockchain clients, into the accept proposal pool to indicate an approval of the blockchain governance proposal or into the reject proposal pool to indicate a disapproval of the blockchain governance proposal;
utilizing the staked tokens in the accept proposal pool to indicate a first number of approval votes;
utilizing the staked tokens in the reject proposal pool to indicate a second number of disapproval votes;
setting voting round periods to be a set of time cycles;
requiring at least two voting round periods to finalize an outcome and wherein the outcome is one of approval of the blockchain governance proposal and of disapproval of the blockchain governance proposal and wherein a current voting round outcome is a tentative outcome and must be followed by a next voting round outcome that has an absence of a veto to finalize the tentative outcome and wherein the veto changes a tentative approval outcome to a tentative disapproval outcome and the veto changes the tentative disapproval outcome to the tentative approval outcome;
entering a first voting round period when the first number of approval votes exceeds the second number of disapproval votes;
setting a first voting round threshold for a first voting round outcome as a difference between the first number of approval votes and the second number of disapproval votes at an end of the first voting round period when the first number of approval votes exceeds the second number of disapproval votes;
proceeding, starting with the first voting round threshold for the first voting round outcome in the first voting round period or initial state of the blockchain, to decide the blockchain governance proposal outcome in an iterative or recursive manner, with a current voting round threshold for a current voting round outcome in a current voting round period acting as the initial state of the blockchain for a next iteration continuing when a next voting round period vetoes the current voting round outcome with a next voting round threshold for the next voting round period exceeding the current voting round threshold; and
adopting the blockchain governance proposal automatically as the blockchain governance proposal outcome when a current number of approval votes exceeds a current number of disapproval votes at an end of the current voting round period and the next voting round period does not veto the current voting round outcome with the next voting round threshold exceeding the current voting round threshold.

2. The method of claim 1, further comprising:
calculating the number of disapproval votes utilizing a multiplier against the staked tokens in the reject proposal pool;
updating an active set of administrators periodically wherein the active set of administrators tally votes; and
supporting concurrent processing of a different blockchain governance proposal.

3. The method of claim 1, further comprising:
requiring the first number of approval votes to exceed the second number of disapproval votes by a 2/3 majority as a prerequisite for adopting the blockchain governance proposal.

4. The method of claim 1, wherein the blockchain governance proposal is a configuration change of the blockchain platform.

5. The method of claim 4, wherein the configuration change is selected from a group consisting of an interest rate multiplier for generating new tokens, a locking period required for the generating new tokens, a percentage of mining transaction rewards reserved for a sharder's pool, a percentage of rewards from the sharder's pool reserved for validators, a maximum number of active miners, voting thresholds, and a multiplier for disapproving votes.

6. The method of claim 1, wherein the blockchain governance proposal is a blockchain moderation.

7. The method of claim 6, wherein the blockchain moderation is selected from a group consisting of seizing a stake of a first service provider, de-registering a second service provider, removing a third service provider from an active set of service providers, and deleting illegal content from a blobber.

8. The method of claim 1, wherein the blockchain governance proposal is to fork a sidechain wherein the sidechain is a tailored blockchain with tailored parameters.

9. An information handling system for efficiently adopting a blockchain governance proposal enabling self-governance on a blockchain platform comprising:
one or more processors;
a memory coupled to at least one of the processors;
a network interface that connects a local node to one or more remote nodes; and
a set of computer program instructions stored in the memory and executed by at least one of the processors in order to perform actions comprising:
responsive to receiving the blockchain governance proposal from a client, by the blockchain platform, creating an accept proposal pool and a reject proposal pool;
staking tokens, by the client, into the accept proposal pool;
staking tokens, by blockchain clients, into the accept proposal pool to indicate an approval of the blockchain governance proposal or into the reject proposal pool to indicate a disapproval of the blockchain governance proposal;
utilizing the staked tokens in the accept proposal pool to indicate a first number of approval votes;
utilizing the staked tokens in the reject proposal pool to indicate a second number of disapproval votes;
setting voting round periods to be a set of time cycles;
requiring at least two voting round periods to finalize an outcome and wherein the outcome is one of approval of the blockchain governance proposal and of disapproval of the blockchain governance proposal and wherein a current voting round outcome is a tentative outcome and must be followed by a next voting round outcome that has an absence of a veto to finalize the tentative outcome and wherein the veto changes a tentative approval outcome to a tentative disapproval outcome and the veto changes the tentative disapproval outcome to the tentative approval outcome;
setting a first voting round threshold for a first voting round outcome as a difference between the first number of approval votes and the second number of disapproval votes at an end of the first voting round period when the first number of approval votes exceeds the second number of disapproval votes;
proceeding, starting with the first voting round threshold for the first voting round outcome in the first voting round period or initial state of the blockchain, to decide the blockchain governance proposal outcome in an iterative or recursive manner, with a current voting round threshold for a current voting round outcome in a current voting round period acting as the initial state of the blockchain for a next iteration continuing when a next voting round period vetoes the current voting round outcome with a next voting round threshold for the next voting round period exceeding the current voting round threshold; and
adopting the blockchain governance proposal automatically as the blockchain governance proposal outcome when the next voting round period does not veto the current voting round outcome with the next voting round threshold exceeding the current voting round threshold.

10. The information system of claim 9, further comprising:
calculating the number of disapproval votes utilizing a multiplier against the staked tokens in the staked tokens in the reject proposal pool
updating an active set of administrators periodically wherein the active set of administrators tally votes; and
supporting concurrent processing of a different blockchain governance proposal.

11. The information handling system of claim 9, further comprising:
requiring the first number of approval votes to exceed the second number of disapproval votes by a 2/3 majority as a prerequisite for adopting the blockchain governance proposal.

12. The information handling system of claim 9, wherein the blockchain governance proposal is a configuration change of the blockchain platform.

13. The information handling system of claim 12, wherein the configuration change is selected from a group consisting of an interest rate multiplier for generating new tokens, a locking period required for the generating new tokens, a percentage of mining transaction rewards reserved for a sharder's pool, a percentage of rewards from the sharder's pool reserved for validators, a maximum number of active miners, voting thresholds, and a multiplier for disapproving votes.

14. The information system of claim 9, wherein the blockchain governance proposal is a blockchain moderation.

15. The information system of claim 14, wherein the blockchain moderation is selected from a group consisting of seizing a stake of a first service provider, de-registering a second service provider, removing a third service provider from an active set of service providers, and deleting illegal content from a blobber.

16. The information system of claim 9, wherein the blockchain governance proposal is to fork a sidechain wherein the sidechain is a tailored blockchain with tailored parameters.

17. A computer program product for efficiently adopting a blockchain governance proposal enabling self-governance on a blockchain platform stored in a non-transitory storage media, comprising computer program code that when executed by an information handling system, performs actions comprising:
responsive to receiving the blockchain governance proposal from a client, by the blockchain platform, creating an accept proposal pool and a reject proposal pool;
staking tokens, by the client, into the accept proposal pool;
staking tokens, by blockchain clients, into the accept proposal pool to indicate an approval of the blockchain governance proposal or into the reject proposal pool to indicate a disapproval of the blockchain governance proposal;
utilizing the staked tokens in the accept proposal pool to indicate a first number of approval votes;
utilizing the staked tokens in the reject proposal pool to indicate a second number of disapproval votes;

setting voting round periods to be a set of time cycles;
requiring at least two voting round periods to finalize an outcome and wherein the outcome is one of approval of the blockchain governance proposal and of disapproval of the blockchain governance proposal and wherein a current voting round outcome is a tentative outcome and must be followed by a next voting round outcome that has an absence of a veto to finalize the tentative outcome and wherein the veto changes a tentative approval outcome to a tentative disapproval outcome and the veto changes the tentative disapproval outcome to the tentative approval outcome;
entering a first voting round period when the first number of approval votes exceeds the second number of disapproval votes;
setting a first voting round threshold for a first voting round outcome as a difference between the first number of approval votes and the second number of disapproval votes at an end of the first voting round period when the first number of approval votes exceeds the second number of disapproval votes;
proceeding, starting with the first voting round threshold for the first voting round outcome in the first voting round period or initial state of the blockchain, to decide the blockchain governance proposal outcome in an iterative or recursive manner, with a current voting round threshold for a current voting round outcome in a current voting round period acting as the initial state of the blockchain for a next iteration continuing when a next voting round period vetoes the current voting round outcome with a next voting round threshold for the next voting round period exceeding the current voting round threshold; and
adopting the blockchain governance proposal automatically as the blockchain governance proposal outcome when a current number of approval votes exceeds a current number of disapproval votes at an end of the current voting round period and the next voting round period does not veto the current voting round outcome with the next voting round threshold exceeding the current voting round threshold.

18. The computer program product of claim 17, further comprising:
calculating the number of disapproval votes utilizing a multiplier against the staked tokens in the staked tokens in the reject proposal pool;
updating an active set of administrators periodically wherein the active set of administrators tally votes; and
supporting concurrent processing of a different blockchain governance proposal.

19. The computer program product of claim 17, further comprising:
requiring the first number of approval votes to exceed the second number of disapproval votes by a 2/3 majority as a prerequisite for adopting the blockchain governance proposal.

20. The computer program product of claim 17, wherein the blockchain governance proposal is a configuration change of the blockchain platform.

21. The computer program product of claim 20, wherein the configuration change is selected from a group consisting of an interest rate multiplier for generating new tokens, a locking period required for the generating new tokens, a percentage of mining transaction rewards reserved for a sharder's pool, a percentage of rewards from the sharder's pool reserved for validators, a maximum number of active miners, voting thresholds, and a multiplier for disapproving votes.

22. The computer program product of claim 17, wherein the blockchain governance proposal is a blockchain moderation.

23. The computer program product of claim 22, wherein the blockchain moderation is selected from a group consisting of seizing a stake of a first service provider, de-registering a second service provider, removing a third service provider from an active set of service providers, and deleting illegal content from a blobber.

24. The computer program product of claim 17, wherein the blockchain governance proposal is to fork a sidechain wherein the sidechain is a tailored blockchain with tailored parameters.

* * * * *